US012252342B2

(12) United States Patent
Solovianenko

(10) Patent No.: US 12,252,342 B2
(45) Date of Patent: Mar. 18, 2025

(54) SELF-DRIVEN CARRIAGE FOR AUTOMATICALLY STORING AND ACCESSING CONTAINERS IN A STORAGE RACK ARRANGEMENT

(71) Applicant: Aristoklitos Enterprises Ltd., Paralimni (CY)

(72) Inventor: Sergey Vladimirovich Solovianenko, Moskau (RU)

(73) Assignee: ARISTOKLITOS ENTERPRISES LTD., Paralimni (CY)

( * ) Notice: Subject to any disclaimer, the term of this patent is extended or adjusted under 35 U.S.C. 154(b) by 470 days.

(21) Appl. No.: 17/760,910

(22) PCT Filed: Sep. 27, 2019

(86) PCT No.: PCT/IB2019/058230
§ 371 (c)(1),
(2) Date: Mar. 16, 2022

(87) PCT Pub. No.: WO2021/059006
PCT Pub. Date: Apr. 1, 2021

(65) Prior Publication Data
US 2022/0356014 A1    Nov. 10, 2022

(51) Int. Cl.
*B65G 1/04*        (2006.01)
*B65G 1/06*        (2006.01)

(52) U.S. Cl.
CPC .......... *B65G 1/0492* (2013.01); *B65G 1/065* (2013.01)

(58) Field of Classification Search
None
See application file for complete search history.

(56) References Cited

U.S. PATENT DOCUMENTS

| 7,381,022 | B1 | 6/2008 | King |
| 10,908,601 | B2* | 2/2021 | Diehr .................. B65G 1/1375 |
| 2008/0159843 | A1 | 7/2008 | Yuyama et al. |
| 2009/0074545 | A1* | 3/2009 | Lert, Jr. .............. B65G 1/1378 |
| | | | 414/267 |
| 2014/0277693 | A1* | 9/2014 | Naylor .................. B65G 1/065 |
| | | | 700/218 |

(Continued)

FOREIGN PATENT DOCUMENTS

| EP | 3370194 A1 | 9/2018 |
| WO | 2005077789 A1 | 8/2005 |
| WO | 2016010429 A1 | 1/2016 |

*Primary Examiner* — Mark C Hageman
(74) *Attorney, Agent, or Firm* — McGlew and Tuttle, P.C.

(57) ABSTRACT

A self-driven carriage (2) stores and accesses containers (4) in a storage rack arrangement (3) and includes a first wheel set (37) driving along a first axis (x) and a second wheel set (43) driving along a second axis (y) transverse to the first axis (x). At least one of the wheel sets is essentially vertically movable between a driving position and an idle position. A lower one of the wheel sets is in the driving position and the upper one of the wheel sets is in the idle position. The carriage includes a support surface (39) that carries a bottom surface of the container and a centering and securing system, centering and securing a container on the support surface, and including engaging elements movable in opposite directions between an idle position and a securing position in which the engaging elements engage the container.

18 Claims, 11 Drawing Sheets

(56) References Cited

U.S. PATENT DOCUMENTS

2017/0050803 A1* 2/2017 Arnold ................. B65G 1/1373
2019/0129371 A1   5/2019 Wagner et al.
2022/0356015 A1* 11/2022 Razumov ............. B65G 1/0492

* cited by examiner

SELF-DRIVEN CARRIAGE FOR AUTOMATICALLY STORING AND ACCESSING CONTAINERS IN A STORAGE RACK ARRANGEMENT

CROSS REFERENCE TO RELATED APPLICATIONS

This application is a United States National Phase Application of International Application PCT/IB2019/058230, filed Sep. 27, 2019, the entire contents of which are incorporated herein by reference.

TECHNICAL FIELD

The present disclosure is directed to the field of automatic warehouse logistics, more particularly to self-driven carriages for automatically storing and accessing containers in a storage rack arrangement, an automatic storage system and a method for automatically storing and retrieving containers in racks of a storage rack arrangement.

BACKGROUND

Automatic storage systems with self-driven carriages are known in the prior art. Such arrangements comprise storage levels, which can be connected by a lift. A lift is comparably complex and limits the throughput of the storage and retrieval system. A storage system with a lift typically comprises a number of moving and thus constructively demanding parts.

US 2017/0050803A1 discloses an alternative storage system. To connect different storage levels with each other a belt conveyor instead of a lift is suggested. The belt conveyor conveys objects along ramped sections of the conveyor to interaction sites on a storage level, where the objects can be picked up by carriages that move along horizontal aisle tracks.

The carriages are bound to their storage level and cannot change the storage level. The object to be transported changes the storage level by means of the belt conveyor. The object to be transported needs to be handed over at least when the object is put on the belt conveyor to be moved from one storage level to another storage level, when the object is picked up by a carriage at the storage level where it is to be moved to, and potentially when the object is handed over from the carriage to the storage site. Handing over the object is time consuming, and the carriage or the belt conveyor could be idle, depending on the demand to move an object on a certain storage level.

A track arrangement with a lift and/or a belt conveyor are limited in their efficiency by idle phases of the carriages, the belt conveyor, and/or the lift when handing over objects at the belt conveyor or the lift, respectively. Thus, the carriages, the belt conveyor, and/or the lift are limited in their occupancy. The belt conveyor and the lift are constructively demanding and the cost-efficiency of such an arrangement can be improved. It is thus desirable to avoid the limitation of the complexity of a lift or a belt conveyor.

EP 3 370 194 A1 discloses a warehouse management system with ramps instead of a lift. A plurality of carriages can traverse the track arrangement on any of the storage levels. The carriages can change the storage level of the rack arrangement by ramps which connect adjacent storage levels. The tracks and the ramps are arranged so that each carriage can follow a putative best route between its current position and, e.g., an object and/or a storage site. More than one carriage can choose a route with a driving direction opposite to the driving of another carriage. Therefore, carriages can potentially crash with each other. To avoid such a crash, a carriage can recalculate and change its route. The change of a route implies that the formerly chosen putative best route has potentially not been optimal and that the carriage has chosen a route which is longer than necessary. Due to the presence of a plurality of carriages and potential online scheduling of routes by the self-driven carriages, such a potential crash can hardly be determined in advance. Due to the change of the route, the time-consumption to transport an object can increase in a manner that is hardly to be predicted. This can reduce the occupancy of the interaction site and the overall efficiency of the storage system.

WO 2005/077789 A1 and WO 2016/010429 A1 disclose warehouse management systems with vehicles that are capable of driving on a two-dimensional horizontal track grid on a certain level, wherein the vehicles change the level by means of one or more lifts.

SUMMARY

It is a problem of the present disclosure to transport objects securely and efficiently in a storage rack arrangement for automatically storing and accessing objects, which is cost-effective and avoids limitations of the occupancy when transporting, storing and retrieving objects.

The problem is solved by a self-driven carriage for automatically storing and accessing containers in a storage rack arrangement according to the present disclosure, a storage system according to the present disclosure, and a method for automatically storing and accessing containers in a storage rack arrangement according to the present disclosure.

According to a first aspect of the present disclosure, a self-driven carriage is provided for automatically storing and accessing containers in a storage rack arrangement, wherein the carriage comprises a first wheel set for driving along a first axis and a second wheel set for driving along a second axis extending transverse to the first axis, wherein at least one of the first wheel set and the second wheel set is essentially vertically movable between a driving position and an idle position, wherein the lower one of the first wheel set and the second wheel set is in the driving position and the upper one of the first wheel set and the second wheel set is in the idle position. The carriage further comprises a support surface for carrying a bottom surface of a container, wherein the carriage further comprises a centering and securing system for centering and securing a container on the support surface, wherein the centering and securing system comprises at least two engaging elements being simultaneously movable in opposite directions to each other between an idle position and a securing position, wherein the engaging elements are configured to engage, in the securing position, with the container for securing the container on the support surface.

The carriage according to the first aspect of the present disclosure is thus able to securely and efficiently transport a container that may be empty or at least partly filled with one or more containers along ramps for changing between levels of the storage system. There is thus no need for complicated and costly lifts. Furthermore, the carriages can be designed to have a relatively flat shape so that the carriages can drive below the containers in the rack with a higher vertical warehouse density, because the carriage movement space below the containers limiting the vertical warehouse density can be reduced. The securing system allows for the carriages to be designed without a recess to receive and secure the container in or lateral support walls to secure the container between. Therefore, the containers need not be secured laterally at a side wall, but can be solely secured at the bottom surface of the container. This has a further beneficial effect that the carriage can thus be much more compact not only in height, but also in length and width. This is particularly advantageous for exchange, repair and maintenance of the carriages that can be shipped easily and cost-efficiently. Preferably, the first wheel set and/or the second wheel set are embedded into the outer contour of the carriage for a most compact design. However, it may be advantageous in particular for the first wheel set if the wheels extend at least partially out of the outer contour of the carriage for securing the carriage against tipping over on sloped tracks. The centering and securing system effectively combines a securing effect and a centering effect by the simultaneous motion of the engaging elements in opposite directions to each other. The container is thereby always centred on the carriage and securely fastened without lateral fixations.

The simultaneous motion of the engaging elements in opposite directions to each other may be a translational or a rotational motion, or a combination thereof. Preferably, the motion of the engaging elements is at least partly directed outward, i.e. away from a central vertical symmetry axis and/or a central vertical symmetry plane of the carriage. The centering effect of the simultaneous motion of the engaging elements in opposite directions is thus preferably achieved in a horizontal plane, i.e. along the first axis and/or along the second axis. The engaging elements are preferably arranged in a symmetric arrangement to each other, i.e. preferably plane-symmetric with respect to a vertical plane through the first axis or the second axis, or circular symmetric with respect to a central vertical symmetry axis of the carriage. Correspondingly, the engaging elements preferably move symmetrically between the idle position and the securing position.

If the container is not centred on the support surface before the engaging elements have reached the securing position, an engaging element on one symmetry side will touch the container earlier than an engaging element on the opposite symmetry side. Thereby, the touching engaging element moves the container towards the centre until the engaging element on the opposite symmetry side engages with the container so that both engaging elements secure the container in a central position on the support surface. In other words, the at least two engaging elements preferably form a mutually corresponding pair of symmetrically arranged and movable engaging elements. In an alternative embodiment, the motion of the engaging elements may be at least partly directed inward, i.e. towards a central vertical symmetry axis and/or a central vertical symmetry plane of the carriage.

Optionally, the engaging elements may be positioned vertically below the support surface in the idle position and vertically above the support surface in the securing position. Therefore, the vertical position of the support surface may determine the total height of the carriage, at least in the idle position of the support surface. When an empty carriage enters a rack to pick up a container, the carriage may thus be as flat as possible. Thereby, the vertical warehouse density can be increased. The containers may be significantly higher than the carriages, e.g. 1.5 times higher or more.

Optionally, the support surface may have a distance to the ends of the carriage along the second axis. This is particularly advantageous if the carriages enter the racks along the first axis and the containers are placed on rack fillets extending along the first axis. When a container is stored at a storage site, the ends of the bottom surface of the container along the second axis may rest on a pair the rack fillets extending along the first axis, whereas the rest of the bottom surface may be freely accessible from below. Therefore, the distance of the support surface to the ends of the carriage along the second axis leaves space for the rack fillets. In other words, the length of the support surface along the second axis is preferably smaller than the distance between the pair of rack fillets in order to be able to fit between the rack fillets for lifting and/or lowering the container from below.

Optionally, the engaging elements may be mechanically coupled with each other and driven by one securing motor. This is efficient in terms of space consumption and production cost. Furthermore, the mechanical coupling between the engaging elements may ensure that they are always simultaneously driven in opposite directions to each other between the idle position and the securing position.

Optionally, the support surface may comprise at least three contact points for securely supporting a bottom surface of a container from below. Optionally, the support surface may be essentially vertically movable relative to the lower one of the first wheel set and the second wheel set being in the driving position. The support surface may be movable relative to only one of the first wheel set and the second wheel set or both. Therefore, the support surface may be passively movable relative to only one of the first wheel set and the second wheel set by the movement of said wheel set. It may thus have a fixed position relative to the other wheel set. Preferably, the support surface is actively movable relative to both wheel sets and the rest of the carriage. Thereby, the vertical positioning of the support surface is independent of the vertical positioning of any of the wheel sets.

Optionally, the first wheel set and/or the second wheel set are essentially vertically movable by at least one lift motor. Preferably, only one of the wheel sets is vertically movable by the at least one lift motor relative to the rest of the carriage. Similarly, the support surface may be essentially vertically movable by the same or another one of the at least one lift motor. Preferably, there are two separate lift motors for the moving the wheel set(s) and for moving the support surface.

Optionally, the first wheel set and the second wheel set are driven by one drive motor. Optionally, the first wheel set and second wheel set may be driven simultaneously when the lower one of the first wheel set and the second wheel set is in the driving position and the upper one of the first wheel set and second wheel set is in the idle position. This is particularly efficient in terms of space consumption and cost. The power consumption for driving the idle wheel set is marginal only.

Optionally, the first wheel set and the second wheel set may be mechanically coupled to first wheel set and the second wheel set may be by a gear system, wherein the gear system is operable with a first gear ratio and a second gear ratio, wherein the gear system is configured for driving the first wheel set with the first gear ratio and for driving the second wheel set with the second gear ratio, wherein the first gear ratio is at least two times, preferably at least three times, larger than the second gear ratio. This is a second aspect of the present disclosure that is particularly advantageous in combination with the first aspect, i.e. the centering and securing system of the carriage, because it allows to climb ramps along the first axis both efficiently and safely. However, this second aspect of the present disclosure is also advantageous independent from the first aspect, i.e. the centering and securing system of the carriage, because it may enable the carriage to climb steeper ramps along the first axis.

Optionally, all wheels of the first wheel set and/or the second wheel set may be coupled to the drive motor to be driven simultaneously. In particular a four-wheel drive for the first wheel set may be beneficial for climbing ramps.

Optionally, the centering and securing system comprises at least one securing motor for simultaneously moving the at least two engaging elements in opposite directions to each other between the idle position and the securing position. The at least one securing motor is preferably one of three motors of the carriage in total, i.e. the drive motor, the lift motor and the securing motor. All motors of the carriage may be fed by the same rechargeable battery or different rechargeable batteries on board of the carriage.

Optionally, the first wheel set may have a first wheel base and the second wheel set may have a second wheel base, wherein the second wheel base is significantly larger than the first wheel base. This is a third aspect of the present disclosure that is particularly advantageous in combination with the first and/or second aspect, because it provides a better ground clearance for entering and leaving ramps along the first axis and thereby allows for a more efficient and safer transport of the containers on ramps along the first axis. However, this third aspect of the present disclosure is also advantageous independent from the other aspects, because it may enable the carriage to enter/leave steeper ramps along the first axis.

Optionally, the length of the carriage along the second axis is significantly longer than the width of the carriage along the first axis. This is particularly advantageous in combination with the above-mentioned third aspect of a larger wheel base of the second wheel set.

According to another dependent or independent aspect of the present disclosure, an automatic storage system is provided, comprising
- at least one self-driven carriage as described above, and
- a plurality of containers for being automatically stored and accessed at storage sites in a storage rack arrangement extending over k storage levels, wherein each container comprises a bottom surface with receiving elements corresponding to the engaging element of the at least one self-driven carriage, wherein the receiving elements of a container have the same arrangement to each other for all containers.

It is particularly advantageous if all containers of the storage system have a standardised bottom surface with a defined arrangement of standardised receiving elements, so that a carriage can transport any of the carriages. The containers may have different heights, but have preferably the same lateral dimensions in length along the second axis and width along the first axis.

Optionally, the automatic storage system may further comprise a track arrangement comprising
- first rail tracks having a first track gauge and extending essentially along the first axis, and
- second rail tracks having a second track gauge and extending essentially along the second axis, wherein the first track gauge is significantly larger than the second track gauge. In order to reduce the risk for the carriages to lose the balance on the rail tracks, the track gauges are preferably as large as possible. This means that the wheels of both wheel sets are preferably located at the ends of the carriage along the first axis and the second axis, respectively. Thus, the difference between the track gauges is particularly beneficial in combination with the carriage being longer along the second axis than wide along the first axis.

Optionally, the track arrangement may comprise at least Z track levels, wherein Z≥k with k being the number of storage levels of the storage rack arrangement, an entry point on the $m^{th}$ track level for each interaction site, wherein $m \in \{1, \ldots Z\}$, and an exit point on the $n^{th}$ track level for each interaction site, wherein $n \in \{1, \ldots, Z\}$. From the entry point, the interaction site can be reached by a carriage via tracks of the track arrangement. From the exit point, the interaction site can be left by a carriage via tracks of the track arrangement. The $m^{th}$ track level is called "entry point level" and the $n^{th}$ track level is called the "exit point level". The entry point level is the track level at which a track leads from the entry point to the interaction site. The exit point level is the track level at which a track leads from the interaction site to the exit point. The track level, at which the interaction site is arranged, is called "interaction site level". All track levels, or at least a subset of them, may correspond to the k storage levels of the storage rack arrangement. However, in some embodiments, the track arrangement may comprise auxiliary intermediate track levels in addition to the track levels that correspond to the storage levels. At an interaction site, a container carried by a carriage may be emptied and/or filled or otherwise processed. While the container is being processed, the one or more batteries of the carriage may be charged by charger module located at the interaction site. The charging may be performed inductively or by an electrical connection with the charger module.

According to the another dependent or independent aspect of the present disclosure, the track arrangement further comprises for each interaction site: Z−m first one-way ramps directed downward towards the entry point, m−1 second one-way ramps directed upward towards the entry point, Z−n third one-way ramps directed upward away from the exit point, and n−1 fourth one-way ramps directed downward away from the exit point. Therein, a one-way ramp is a ramped track. A first one-way ramp is a ramped one-way track that extends from track level Z downward to Z−1, from Z−1 to Z−2, . . . , and from Z−m+1 to Z−m. A second one-way ramp is a ramped one-way track that extends upward from track level 1 to 2, from 2 to 3, . . . , and from m−1 to m. A third one-way ramp is a ramped one-way track that extends upward from track level n to n+1, from n+1 to n+2, . . . , and from Z−1 to Z. A fourth one-way ramp is a ramped one-way track that extends downward from track level n to n−1, from n−1 to n−2, . . . , and from 2 to 1.

The one-way ramps ensure that a carriage can change track levels effectively. A carriage on a track level can access any other track level by choosing a path along one or more of the one-way ramps which leads to the chosen storage level. A carriage can transport a container over one or more storage levels from the interaction site to a storage site, or from a storage site to the interaction site by the one-way ramps. i.e. a potentially time-consuming handing over of containers can be dispensed with. The throughput of the track arrangement is determined by the tracks and the carriages and is not limited by other transportation means, e.g. by a lift or a belt conveyor, and/or a carriage that is idle when waiting for said other transportation means. Thereby, the complexity and the construction of the track arrangement is comparably simple and comprises only one or more carriages as movable parts which makes the track arrangement cost-effective.

The one-way ramps ensure that there is at least one first path, i.e. a route that a carriage can take, between a storage level and the interaction site so that a container can be moved from a storage site to the interaction site and at least one second path between the interaction site and any storage level so that a container can be moved from the interaction site to a storage site. This reduces the risk of a potential crash and therefore of a recalculation and change of a route.

Optionally, for each interaction site, the entry point and the exit point may be arranged at an identical track level. In this embodiment, the interaction site can be reached from the same track level from where the interaction site can be left. This is particularly efficient, when a container is to be stored at and/or picked up from the storage level at which the interaction site is arranged. In this embodiment, the entry point level and the exit point level are identical per interaction site to improve the efficiency of the layout and construction of the track arrangement. In an alternative embodiment, the entry point level can be different from the interaction site level. This can be particularly effective to provide a path without the risk of a collision, e.g. when the track arrangement comprises exactly one route via one-way ramps between the entry point and the interaction site.

Optionally, one or more of the first one-way ramps, of the second one-way ramps, of the third one-way ramps, and/or of the fourth one-way ramps may be arranged to connect adjacent track levels with each other. This embodiment provides a track arrangement that allows a carriage to move directly from one track level to an adjacent track level, i.e. from a track level $n \in \{1, \ldots, Z\}$ to an upper track level $n+1 \in \{1, \ldots, Z\}$ and/or to a lower track level $n-1 \in \{1, \ldots, Z\}$. This embodiment comprises shortest possible paths between adjacent storage levels.

Optionally, one or more of the first one-way ramps, of the second one-way ramps, of the third one-way ramps, and/or of the fourth one-way ramps may be arranged to connect next-nearest track levels with each other and/or at least two track levels with each other having two or more track levels between said connected at least two track levels. i.e. such a one-way ramp extends over at least three track levels but does not need to connect adjacent track levels. This embodiment provides a track arrangement that allows a carriage to move directly from one track level to a track level with at least one track level in between, i.e. from a track level $n \in \{1, \ldots, Z\}$ to an upper storage level $n+s \in \{1, \ldots, Z\}$, $s \geq 2$ and/or to a lower storage level $n-s \in \{1, \ldots, Z\}$, $s \geq 2$. This embodiment can be particularly effective in providing a path to prevent a potential collision of carriages which improves the efficiency of transportation.

Optionally, the first one-way ramps may comprise a first sequence of first ramps, the second one-way ramps may comprise a second sequence of second ramps, the third one-way ramps may comprise a third sequence of third ramps and/or the fourth one-way ramps may comprise a fourth sequence of fourth ramps. Preferably, a sequence of ramps may be a plurality of one-way ramps, wherein an exit point of one one-way ramp is identical to or close to an entry point of a subsequent one-way ramp. i.e., a carriage can move along the sequence of ramps while traversing said one-way ramps without traversing longer tracks other than said one-way ramps. Advantageously, each subsequent pair of one-way ramps of a sequence of ramps is connected with each other by one or two horizontal connection points. A sequence of ramps improves the efficiency of transporting a container from one level to another level by passing one or more levels in between.

Optionally, the track arrangement may comprise a plurality of interaction sites to issue and/or retrieve a plurality of containers preferably with a plurality of carriages simultaneously. The interaction sites can be arranged at an identical track level. Alternatively, at least two interaction sites can be arranged at different track levels which can improve the performance of the automated storage and retrieval system, e.g. when one interaction site is arranged near storage sites which are accessed more frequently than other storage sites further away from said interaction site.

Optionally, a first subset of first one-way ramps, a second subset of second one-way ramps, a third subset of third one-way ramps, and/or a fourth subset of fourth one-way ramps may be configured to connect any one of the storage sites with exactly one interaction site. The first subset of first one-way ramps may comprise preferably $Z-m$ first one-way ramps directed downward towards the entry point of the interaction that it connects to. It is possible that the track arrangement comprises a plurality of first subsets of first one-way ramps, wherein any two first subsets of first one-way ramps are configured to connect to different interaction sites. The second subset of second one-way ramps comprises preferably $m-1$ second one-way ramps directed upward towards the entry point. The third subset of third one-way ramps comprises preferably $Z-n$ third one-way ramps directed upward away from the exit point. The fourth subset of fourth one-way ramps comprises preferably $n-1$ fourth one-way ramps directed downward away from the exit point. Similarly, as explained with reference to the first subset of first one-way ramps, the track arrangement can comprise a plurality of second subsets of second one-way tracks, third subsets of third one-way tracks and/or fourth subsets of fourth one-way tracks, wherein any two of said subsets of one-way ramps are configured to connect to different interaction sites. This is particular effective since the risk of collisions of carriages on the routes from an entry point and its interaction site can be significantly reduced.

Optionally, for each interaction site, the first subset of first one-way ramps, the second subset of second one-way ramps, the third subset of third one-way ramps, and/or the fourth subset of fourth one-way ramps may be configured to connect any one of the storage sites with exactly one interaction site. This embodiment reduces the risk of collisions of carriages and provides the possibility of a modular arrangement of the track arrangement. i.e. the subsets of one-way ramps and the corresponding interaction sites can be repeated transversely to the aisle direction periodically along the rack arrangement, wherein each periodic repetition can comprise one or more of said subsets of one-way ramps and one or more interaction sites.

Optionally, the track arrangement may comprise at least one bidirectional horizontal track connectable to all aisle tracks on each storage level. The bidirectional horizontal track can connect any aisle track with connection points, wherein a connection point connects the bidirectional horizontal track to one or more one-way ramps. i.e. a carriage can drive a path between a storage site and the interaction site by traversing the horizontal aisle track, the horizontal bidirectional track and one or more of the one-way ramps. The bidirectional horizontal track can connect one or more aisle tracks with one or more of the one-way ramps to provide a plurality of possible paths for the carriages.

Optionally, the track arrangement may comprise a first horizontal one-way track connectable to all aisle tracks on each storage level in a first driving direction. The first horizontal one-way track may prevent that carriages crash during traversing the horizontal one-way track. Therefore, a carriage can choose an optimal route, e.g. between the interaction site and the storage site. A recalculation and change of a route of a carriage can be dispensed with, which improves the efficiency of transportation of a container.

Optionally, the track arrangement may comprise a second horizontal one-way track connectable to all aisle tracks on each storage level in a second driving direction opposite to the first direction. The two horizontal one-way tracks of the track arrangement allow a movement of a carriage in any horizontal direction transverse to the aisle direction to move towards or away from an aisle efficiently on an optimal route.

Optionally, on at least one storage level, the bidirectional horizontal track, the first horizontal one-way track and/or the second horizontal one-way track may extend transversely to the aisle direction to improve the construction of the track arrangement by providing a space-saving embodiment, which allows for short paths. This embodiment is particularly space saving in the aisle direction at a front face of the rack arrangement at which the track arrangement is arrangeable.

Optionally, the bidirectional horizontal track, the first horizontal one-way track and/or the second horizontal one-way track may be arranged, in the aisle direction, between the aisle tracks and any of the first, second, third, and/or fourth one-way ramps. This embodiment comprises the minimum number of cross-sections of tracks and thereby provides a track arrangement with a minimum chance that two paths of carriages cross each other simultaneously.

Optionally, the first one-way ramps, the second one-way ramps, the third one-way ramps, and/or the fourth one-way ramps may have a driving direction transverse to the aisle direction to allow an effective arrangement of the one-way tracks that is space-saving and provides short paths.

Optionally, the track arrangement may comprise at least one connection track, wherein the connection track extends in aisle direction. The connection track(s) may be bidirectional or unidirectional. The connection track may extend along the aisles to allow a carriage to drive towards and away from a storage site at the same section of the aisle track. In this embodiment, the track arrangement can be arranged at one face, e.g., the front face, of the rack arrangement. The connection track can extend outside an aisle to provide an efficient change of different tracks.

Optionally, the at least one connection track may comprise at least one connection point, wherein the connected point connects at least two of the following with each other: one or more horizontal tracks, one or more one-way ramps, and/or the interaction site. i.e., a connection point is a horizontal track section, which connects different parts of the track arrangement, e.g., ramps and/or horizontal tracks, with each other. By aligning at least one connection point at a connection track an effective change of different tracks is possible. Preferably, a connection track comprises a plurality of connection points to allow an effective change between a plurality of different tracks on a shortest path.

Optionally, subsequent first one-way ramps may be connected to each other by one or two horizontal connection points and/or subsequent second one-way ramps may be connected to each other by one or two horizontal connection points, and/or subsequent third one-way ramps may be connected to each other by one or two horizontal connection points, and/or subsequent fourth one-way ramps may be connected to each other by one or two horizontal connection points. A pair of subsequent ramps may be connected by means of the connection point without any further horizontal track between said ramps. In this embodiment, subsequent ramps are connected so that a path along subsequent ramps between multiple levels has a short length.

Optionally, any connection point may be arranged on a three-dimensional grid, i.e. each connection point may define a grid point of the three-dimensional grid. This embodiment can improve the layout of the track arrangement and simplify the navigation and/or coordination of one or more carriages. The grid provides well defined coordinates at grid points where connection points can be located. Not any of the grid points needs to comprise a connection point. i.e., the grid can comprise a grid point without a connection point.

Optionally, the grid may comprise Z track levels, Y track rows, and X track columns, wherein X, Y, Z $\in \mathbb{N}$, wherein each track row extends horizontally and transverse to the aisle direction, and each track column extends vertically to provide an alignment of the grid and the track arrangement. Thus, a sequence of track rows extends horizontally along the aisle direction, whereas a sequence of track columns extends horizontally transversely to the aisle direction. The track columns may be connected to each other by the ramps. If the length of the ramps is L and the slope angle of the ramps is $\alpha$, the distance D between the track columns may be $D=L \cdot \sin \alpha$.

Optionally, the number of track levels may equal the number of storage levels, i.e. Z=k, at each storage level, at least one connection point is potentially arranged. However, in some embodiments, the track arrangement may comprise auxiliary intermediate track levels in addition to the track levels that correspond to the storage levels, i.e. Z>k. The number of track rows is preferably three to five to provide a space-saving embodiment. An embodiment with three track rows may comprise on each level a bidirectional horizontal track in a first track row closest to the storage rack arrangement, one-way ramps with a positive slope angle in a second track row, and one-way ramps with a negative slope angle in a third track row. Alternatively, the second track row may comprise one-way ramps with a negative slope angle, whereas the third track row may comprise one-way ramps with a positive slope angle. An embodiment with four track rows may comprise on each level a first unidirectional horizontal track in a first horizontal driving direction transverse to the aisle direction yn the first track row and a second unidirectional horizontal track in a second horizontal driving direction opposite the first horizontal driving direction yn the second track row. The third track row may comprise one-way ramps with a positive(negative) slope angle, whereas the fourth track row may comprise one-way ramps with a negative(positive) slope angle. An embodiment with five track rows may be similar to the embodiment with four track rows, but an additional track row may comprise on each level a bidirectional horizontal track for adapting the distance between track columns of the track arrangement (determined by the ramp length and the ramp slope angle) to the distance between aisles of the storage rack arrangement. Preferably, the number of track columns equals the number of levels in order to reduce the number directional changes of the carriages. If the number of track columns must be chosen to be less than the number of levels, for example due to lateral space limitations, a path along a sequence of ramps may include turns of 180 degrees via two adjacent connection points including a transfer to the adjacent track row. Preferably, the entry point and exit point of an interaction site are arranged at adjacent track columns on the same level. A "180-degree turn" on a one-way path shall mean herein that the carriage changes to the opposite driving directing by two subsequent 90-degree turns at two adjacent connection points to change to another unidirectional or bidirectional track allowing the opposite driving direction. This means that the carriage must change the track row during a 180-degree turn on a one-way path.

Optionally, between each pair of adjacent track columns one or more (up to Y-1) one-way ramps with a positive slope angle may be arranged in one track row, and between the same pair of adjacent track columns the same number of ramps with a negative slope angle may be arranged in an adjacent track row. The ramps of the same track row may be preferably arranged essentially in parallel to each other. These embodiments each provide a track arrangement with an improved usage of constructive space in the aisle direction.

Optionally, at least one of the first one-way ramps, second one-way ramps, third one-way ramps, and/or fourth one-way ramps may have a slope angle of 5 to 20 degrees, preferably 12 to 17 degrees. For example, at least one of the ramps may have a slope angle of 15 degrees. This embodiment provides a slope angle so that each ramp is effectively drivable by a carriage and requires a preferred amount of constructive space in horizontal direction to connect different storage levels. Preferably, the absolute amount of the slope angle of all ramps is essentially the same. Preferably, the sign of the slope angle is essentially the same for all ramps of the same track row and different between ramps of adjacent track rows. Preferably, the all ramps have essentially the same length. Thereby, the ramps may all be identical to each other to reduce the diversity of parts the track arrangement is composed of.

Optionally, the at least one interaction site may comprise a charger module for charging a battery of a carriage during automatically processing a stored container and/or automatically issuing a container to be stored. In this embodiment, a carriage can be charged during handing over a container to and/or from the carriage. The time during a stored container is processed and/or a container to be stored is issued is thereby used effectively. Preferably, this time is sufficient to charge the battery to last until the carriage returns to a charger module next time, so that the carriage does not any extra pauses to charge its battery.

Optionally, the track arrangement may comprise a one-way interaction track to connect the entry point of the interaction site with the at least one interaction site and the at least one interaction site with the exit point of the interaction site. This embodiment improves the connection of the interaction site with other tracks of the track arrangement. The one-way interaction track prevents potential collision of carriages that drive towards or away from the interaction site. Preferably, the interaction track is a loop which leads from the entry point via the interaction site to the exit point. The loop is preferably closed by the first horizontal one-way track and/or the second horizontal one-way track. Optionally, the one-way interaction track comprises and/or is a horizontal track.

Optionally, the track arrangement may be arranged so that it can be scaled and extended as desired by one or more levels and/or track columns of the track arrangement. Thus, the track arrangement may be comprised of a modular construction kit comprising ramps, horizontal tracks and connection points. The size and layout of such a track arrangement can be adjusted to the storage rack arrangement by choosing the most appropriate number of track columns and ramps per track column.

Optionally, the track arrangement may comprise an optical marker, an electrical tag and/or a lane marking so that a carriage can detect its position and/or check/improve its position information. Preferably, the carriage may comprise a detection device which is adapted to detect a marker, tag and/or marking of any of the one-way tracks. For example, the carriage may comprise a camera to detect an optical marker and/or lane marking, and/or an RFID reader to read an electrical tag. A marker, tag, and/or marking can be arranged in and/or at a track bed of a track which are configured to guide the carriages along said track.

According to another dependent or independent aspect of the present disclosure, an automated storage and retrieval system is provided comprising the aforementioned track arrangement and at least one self-driven carriage being configured to drive along a defined first path along one-way ramps of the track arrangement for automatically transporting a stored container from a storage site to an interaction site and/or to drive along a defined second path along one-way ramps of the track arrangement for automatically transporting a container from the interaction site to a storage site. The at least one carriage may comprise a battery to power a drive motor of the carriage and preferably to be charged by a charging module which may be located at the interaction site; a detection device which is adapted to detect a marker, tag and/or marking of any of the one-way tracks; and a driving arrangement to interact with the tracks, e.g. the driving arrangement may comprise wheels with a lateral distance and wheelbase that fits the tracks and ramps of the track arrangement.

Optionally, the at least one carriage may comprise a first wheel set of four wheels for driving fourth and back in the aisle direction and a second wheel set of four further wheels for driving fourth and back transversely to the aisle direction and for driving the ramps upward/downward. The driving direction of the first wheel set differs from the driving direction of the second wheel set by 90 degrees. At least one of the first wheel set and the second wheel set may be vertically lowered and lifted relative to the other wheel set, so that the lower wheel set is the active wheel set for driving while the upper wheel set is the idle wheel set. The driving direction may be changed at connection points of the track arrangement by changing the active wheel set, i.e. by lowering the idle wheel set and/or lifting the active wheel set.

Optionally, the track arrangement is arranged at a front face of the storage rack arrangement to provide a space-saving construction of the automated storage and retrieval system.

Optionally, the at least one carriage may comprise a sensor arrangement and the track arrangement comprises an optical marker, an electrical tag and/or a lane marking, wherein the sensor arrangement is configured to identify the optical marker, the electrical tag and/or the lane marking for determining the position of the at least one carriage in the track arrangement.

According to another dependent or independent aspect of the present disclosure, a method for automatically storing and/or retrieving containers in racks of a storage rack arrangement is provided. The method comprising the steps of:

driving a self-driven carriage on a first rail track having a first track gauge and extending along a first axis for positioning the carriage at an aisle between the racks, wherein the carriage is driven with a first gear ratio, driving the carriage on a second rail track having a second track gauge and extending along a second axis transverse to the first axis for positioning the carriage along the aisle, wherein the carriage is driven with a second gear ratio, driving the carriage on a first rail track having the first track gauge and extending along the first axis for positioning the carriage within a rack below a container, wherein the carriage is driven with the first gear ratio, lifting a support surface of the carriage for carrying a bottom surface of the container, securing and centering the container on the support surface by simultaneously moving at least two engaging elements in opposite directions to each other from an idle position into a securing position for engaging, in the securing position, with corresponding receiving elements at the bottom surface of the container, driving the carriage carrying the container on the first rail track for leaving the rack towards an aisle, wherein the carriage is driven with the first gear ratio, lowering the support surface, and driving the carriage on a second rail track having a second track gauge and extending along the second axis for leaving the aisle towards an interaction site for processing the container, wherein the carriage is driven with the second gear ratio, The above steps may preferably be steps for retrieving a container from the storage rack arrangement. The steps above may be typically performed after the carriage has stored another container in the storage rack arrangement is now available for a new task. For instance, the carriage may be already on the desired storage level of the new task and may, in the first step, drive on a horizontal track being a first rail track to find the desired aisle. As a second step, the carriage may enter the aisle along an aisle track being a second rail track with a narrower track gauge than the horizontal track being a first rail track. In the second step, the carriage may drive with a lower gear ratio for driving faster at a certain motor speed compared to driving on a first rail track with a higher gear ratio at the same motor speed. This is particularly advantageous to reduce the time for storing and/or retrieving the container if the storage rack arrangement is longer along the second axis than along than along the first axis.

In the second step, the carriage may find the desired position along the aisle for entering the rack. In the third step, the carriage may enter the rack to find the desired position below a desired container. The containers may be placed on rack fillets extending along the first axis and having a vertical distance to the first rail tracks within the storage rack arrangement. The vertical distance is preferably larger than the height of the carriage so that the carriages can enter the storage rack arrangement below the rack fillets. There may be one or more than one container placed above the same first rail track within the storage rack arrangement. An embodiment with only one container per first rail track may be advantageous for a quick retrieving and storing time, because there is no need for rearranging other containers before retrieving or storing the desired container. A first rail track may connect to the adjacent first rail track of the neighbouring track accessible from the neighbouring aisle, so that a carriage may enter a first rail track from one aisle and leave it via the connected first rail track at the other aisle, or vice versa. In case of more than one container stored over one first rail track, it may be necessary to rearrange containers to other free, preferably close-by, storage sites before the desired container or storage site can be accessed. An embodiment of more than one container per first rail track may be thus slower in terms of retrieving and storing time, but advantageous in terms of lateral warehouse density, because fewer aisles are needed. Preferably, the position along a first rail track within the storage rack arrangement may depend on the expected time for next access of the container. For less frequently accessed containers, a "deeper" position within the rack may be preferred, whereas more frequently accessed containers may be placed closer to an aisle.

Once the path between the desired container and an aisle is free and the carriage is placed below the desired container, the support surface of the carriage may be lifted for carrying a bottom surface of the container in the fourth step. The container may thus be lifted off the rack fillets on which it stood. The support surface therefore preferably fits between the rack fillets. In a fifth step, the container may be secured and centred on the support surface by simultaneously moving at least two engaging elements in opposite directions to each other from an idle position into a securing position for engaging, in the securing position, with corresponding receiving elements at the bottom surface of the container. There is thus no need for the carriages to have securing side walls, which would be detrimental to the desired compact design of the carriages.

In a sixth step, the carriage carrying the container from below may either drive to the same aisle it came from or via a connected first rail track to the neighbouring aisle, depending on which path is free and/or shortest to the destination, i.e. the desired interaction site.

Once the carriage has left the rack and is positioned on an aisle track being a second rail track, the carriage may lower the support surface again to lower the centre-of-gravity of the carriage carrying the container in a seventh step. This reduces the risk of the carriage falling over at ramps or bumps or during quickly breaking and accelerating.

In the last eighth step, the carriages may drive quickly with the second gear ratio along the aisle track back towards the horizontal track at the front face of the storage rack arrangement. The horizontal track may be part of a track arrangement at the front face of the storage rack arrangement for accessing other track levels and finally entering the interaction site via first or second one-way ramps as described above.

Optionally, preferably for storing a container in the storage rack arrangement, the method may further comprise:

driving the carriage carrying the container on a first rail track having the first track gauge and extending along the first axis for positioning the carriage at an aisle between the racks, wherein the carriage is driven with the first gear ratio, driving the carriage carrying the container on a second rail track having the second track gauge and extending along the second axis transverse to the first axis for positioning the carriage along the aisle, wherein the carriage is driven with the second gear ratio, lifting the support surface of the carriage together with the container, driving the carriage carrying the container on the first rail track for positioning the carriage within a rack at an empty storage site, wherein the carriage is driven with the first gear ratio, unsecuring the container by simultaneously moving the at least two engaging elements in opposite directions to each other from the securing position into the idle position for disengaging, in the idle position, the receiving elements at the bottom surface of the container, lowering the support surface for placing the container at the storage site, and driving the carriage on the first rail track for leaving the rack towards an aisle, wherein the carriage is driven with the first gear ratio.

The steps above may be performed independently of the steps for retrieving a container, but preferably performed in combination for retrieving and storing containers. The steps above may be typically performed after the container has been issued at the interaction site and left the interaction site via third or fourth one-way ramps to reach the desired storage level.

For instance, the carriage may be already on the desired storage level and may, in the first step, drive on a horizontal track being a first rail track to find the desired aisle. As a second step, the carriage may enter the aisle along an aisle track being a second rail track with a narrower track gauge than the horizontal track being a first rail track. In the second step, the carriage may drive with a lower gear ratio for driving faster at a certain motor speed compared to driving on a first rail track with a higher gear ratio at the same motor speed. This is particularly advantageous to reduce the time for storing and/or retrieving the container if the storage rack arrangement is longer along the second axis than along than along the first axis.

Once the carriage has found the desired rack, the carriage may lift the support surface to lift the container above the rack fillets in order to be able to enter the rack in a third step. The carriage may drive on the first rail track below rack fillets while it is carrying the container above the rack fillets. Driving with a lifted support surface only when necessary reduces the risk of the carriage falling over at ramps or bumps or during quickly breaking and accelerating.

In the fourth step, the carriage may enter the rack to find the desired storage site along the first rail track for storing the container. The containers may be placed on rack fillets extending along the first axis and having a vertical distance to the first rail tracks within the storage rack arrangement. The vertical distance is preferably larger than the height of the carriage so that the carriage can enter the storage rack arrangement below the rack fillets and carry the container above the rack fillets. There may be one or more container already stored in the way between the aisle and the desired storage site. In such a case, the carriage must park the container it is actually carrying at another close-by free storage site for rearranging the other containers until the path to the storage site is free. An embodiment with only one container per first rail track may be advantageous for a quick retrieving and storing time, because there is no need for rearranging other containers before retrieving or storing the desired container. A first rail track may connect to the adjacent first rail track of the neighbouring track accessible from the neighbouring aisle, so that a carriage may access a storage site from two neighbouring aisles. An embodiment of more than one container per first rail track may be slower in terms of retrieving and storing time, but advantageous in terms of lateral warehouse density, because fewer aisles are needed. Preferably, the position of a storage site along a first rail track within the storage rack arrangement may depend on the expected time for next access of the container at issue. For less frequently accessed containers, a "deeper" position within the rack may be preferred, whereas more frequently accessed containers may be placed closer to an aisle.

Once the path between the desired container and an aisle is free and the carriage carrying the container at issue below the desired free storage site, the support surface of the carriage may be lowered for placing a bottom surface of the container on the rack fillets in the fourth step. The support surface therefore preferably fits between the rack fillets. In a fifth step, the container may be unsecured by simultaneously moving the at least two engaging elements in opposite directions to each other from the securing position into the idle position for disengaging, in the idle position, the receiving elements at the bottom surface of the container. There is thus no need for the carriages to have securing side walls, which would be detrimental to the desired compact design of the carriages. Securing side walls of the carriages would also reduce the warehouse density along the first axis and/or the second axis, because the containers would need to be stored with a larger horizontal distance to each other along the first axis and/or the second axis.

In a sixth step, the carriage without the container may either drive to the same aisle it came from or via a connected first rail track to the neighbouring aisle, depending on which path is free and/or shortest to the destination, i.e. the desired container of the next task.

Once the carriage has left the rack and is positioned on an aisle track being a second rail track, the carriage may lower the support surface again to lower the centre-of-gravity of the carriage carrying the container in a last seventh step. This reduces the risk of the carriage falling over at ramps or bumps or during quickly breaking and accelerating.

In an optional eighth step, the carriages may drive quickly with the second gear ratio along the aisle track back towards the horizontal track at the front face of the storage rack arrangement for the next task. The horizontal track may be part of a track arrangement at the front face of the storage rack arrangement for accessing other track levels and finally accessing the storage level of the next task.

Optionally, the first gear ratio is at least two times, preferably at least three times, larger than the second gear ratio. This is particularly useful for driving efficiently on ramps for changing between track levels and driving quickly along the aisle tracks.

Optionally, the first track gauge is significantly larger than the second track gauge. This is particularly advantageous, because the carriages may have a first wheel set for driving along the first axis, wherein the first wheel set may have a relatively short first wheel base for driving along the ramps. For driving safely and more quickly, the carriages may have a second wheel set for driving along the second axis, wherein the second wheel set may have a relatively long second wheel base for driving along the aisle tracks. As the wheels of the wheel sets are preferably positioned at the most lateral positions as possible for the sake of driving stability, the first track gauge is preferably significantly larger than the second track gauge.

Optionally, driving the carriage with or without the container on a first rail track comprises driving on a ramp for changing between storage levels of the storage rack arrangement. Preferably, these ramps are the first, second, third and fourth one-way ramps of a track arrangement at the front face of the storage rack arrangement. So, the first rail tracks are preferably not only used within the storage rack arrangement for accessing and storing containers in a rack, but also on the ramps and on the horizontal tracks along the first axis.

BREIF DSCRIPTION OF THE DRAWINGS

Embodiments of the present disclosure will now be described by way of example with reference to the following figures of which:

Figure 2:
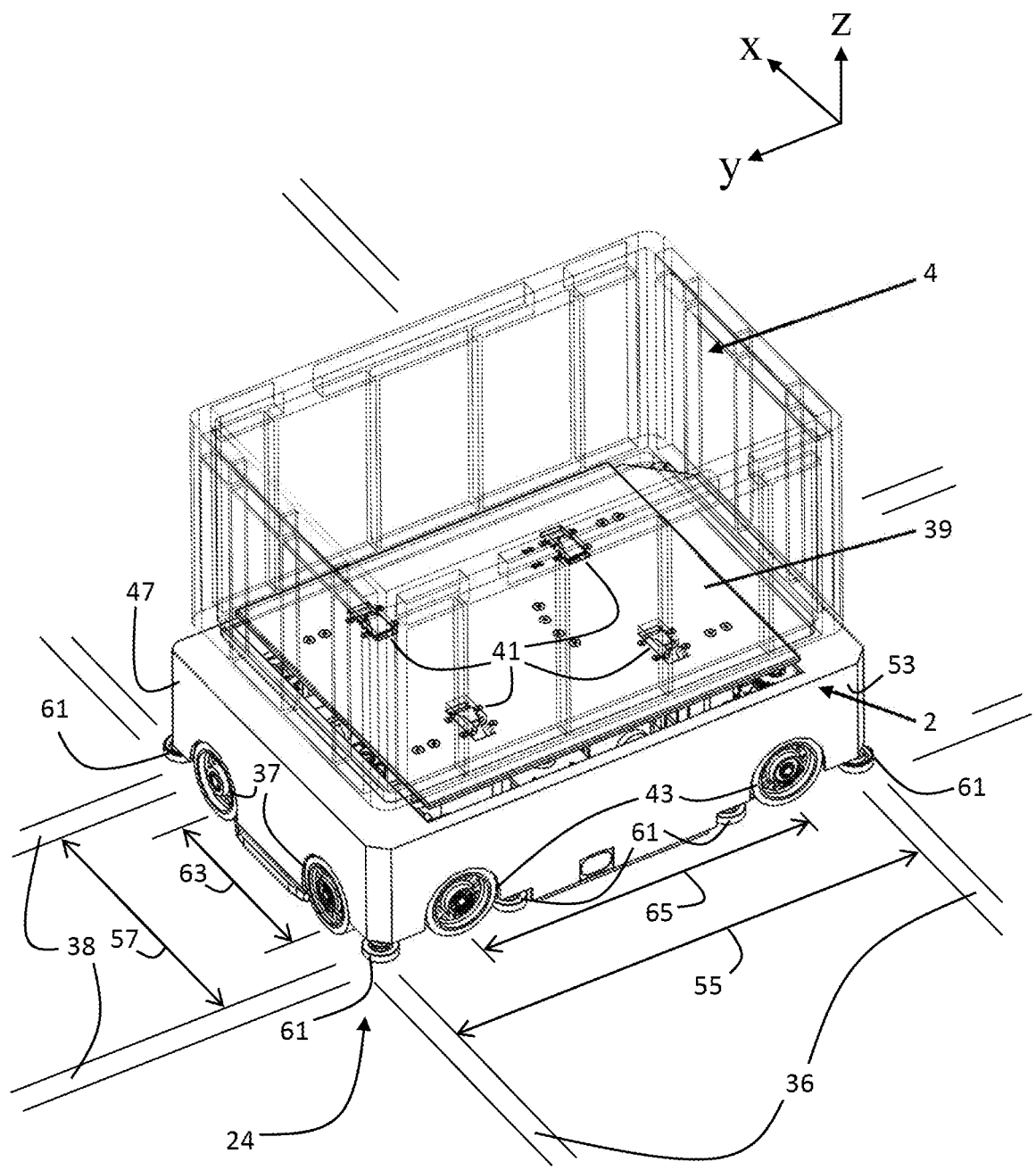
FIG. 2 is a perspective view of an embodiment of a carriage carrying a container according to the present disclosure.
Figure 3:
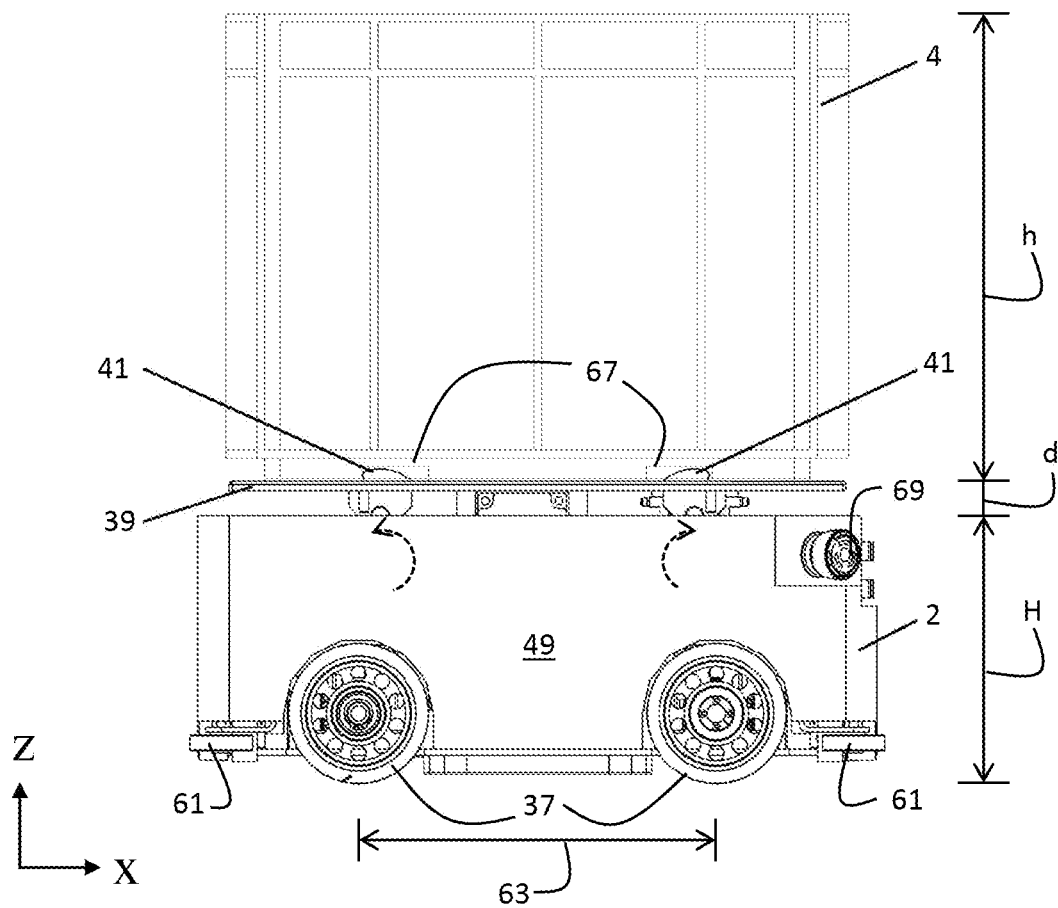
FIG. 3 is a side view along the second axis of the carriage carrying a container shown in FIG. 2.
Figure 4A:
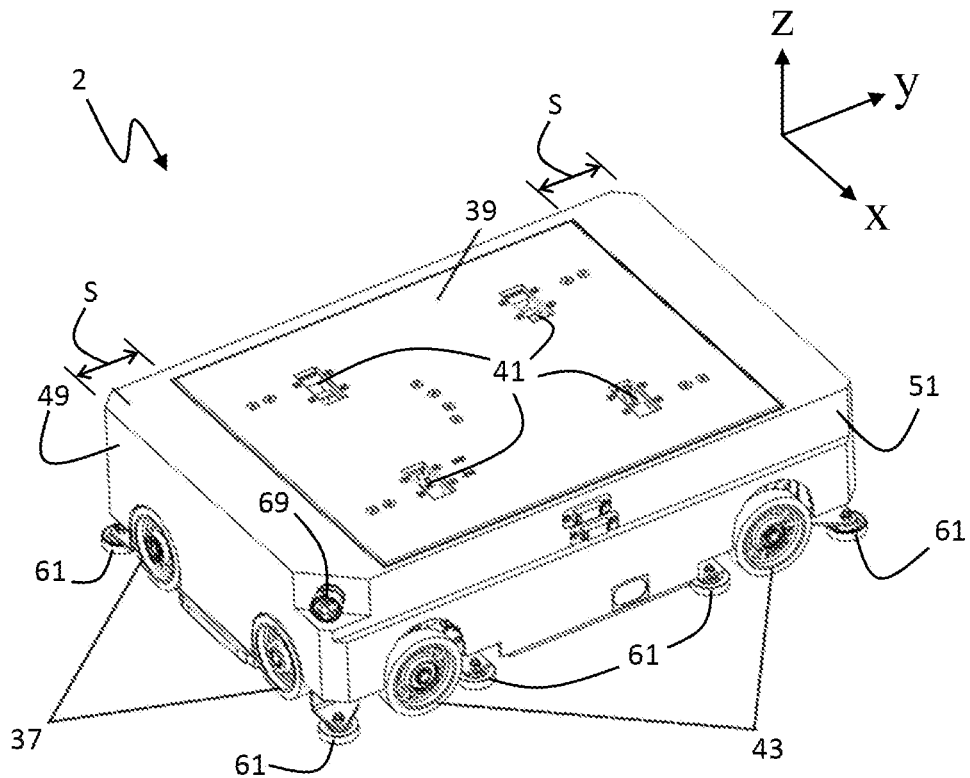
Figure 4B:
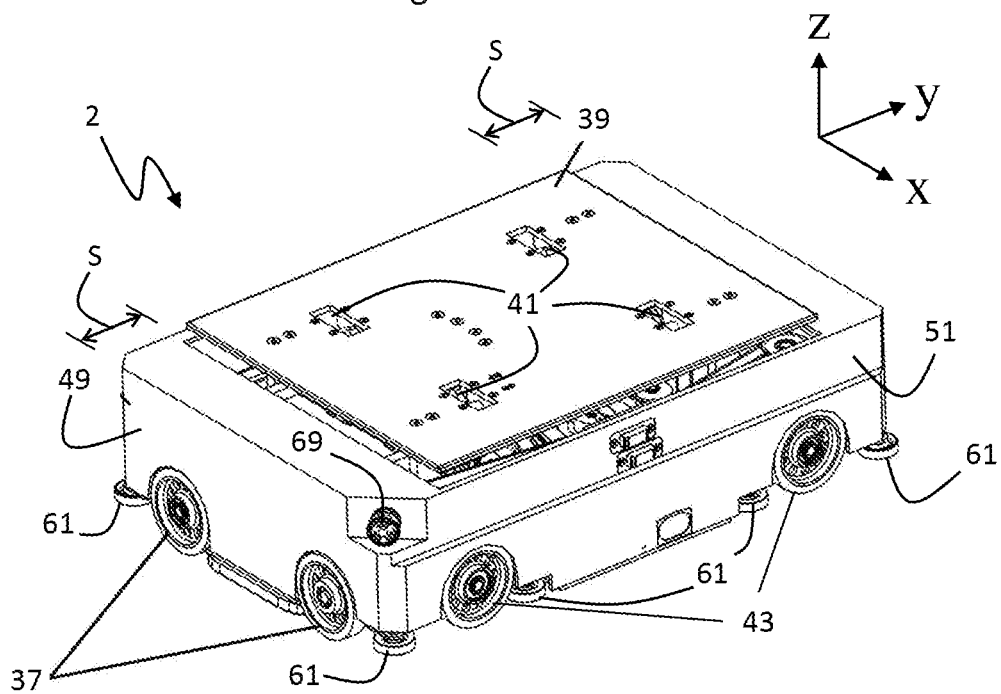
Figure 5:
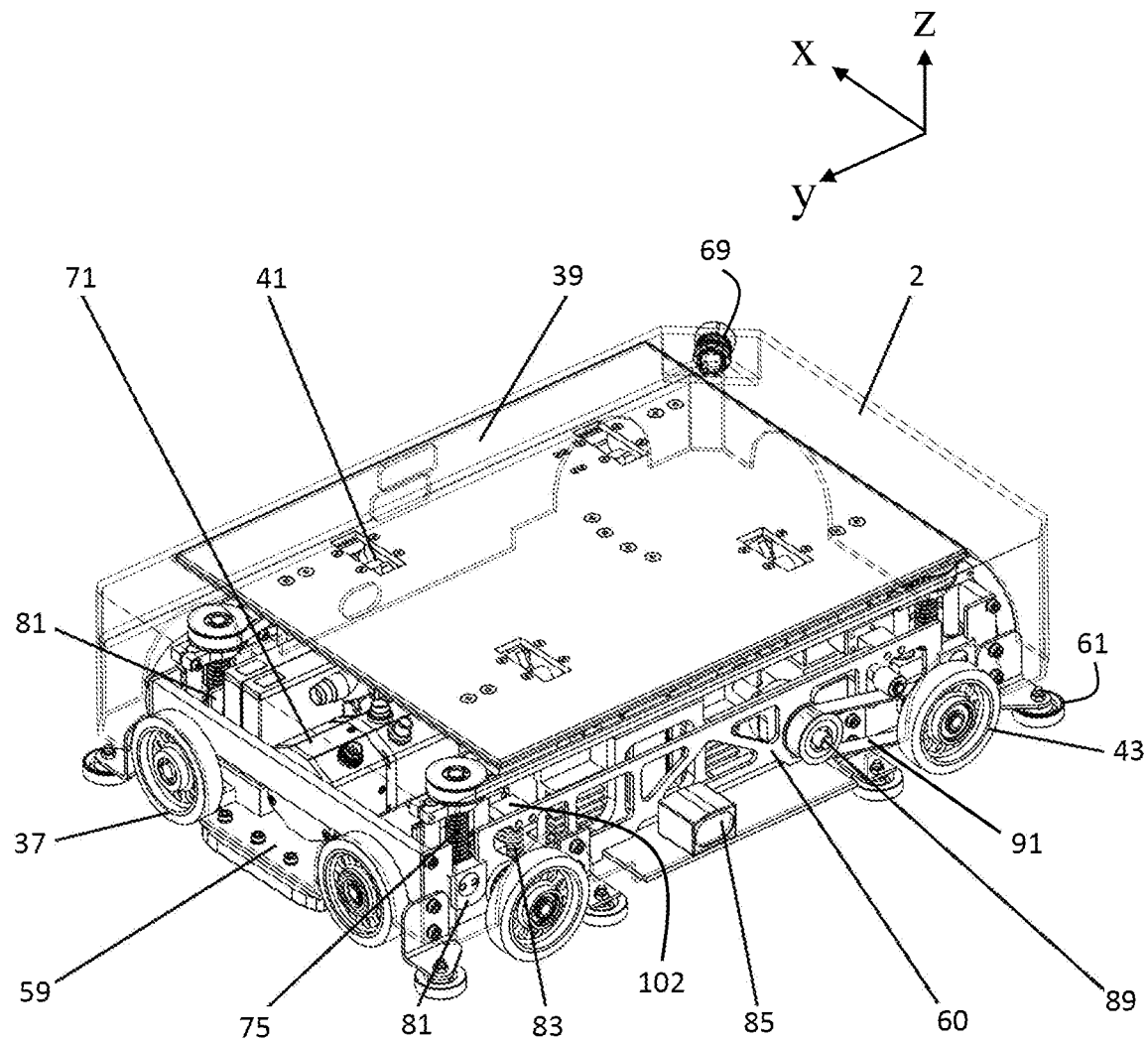
Figure 6:
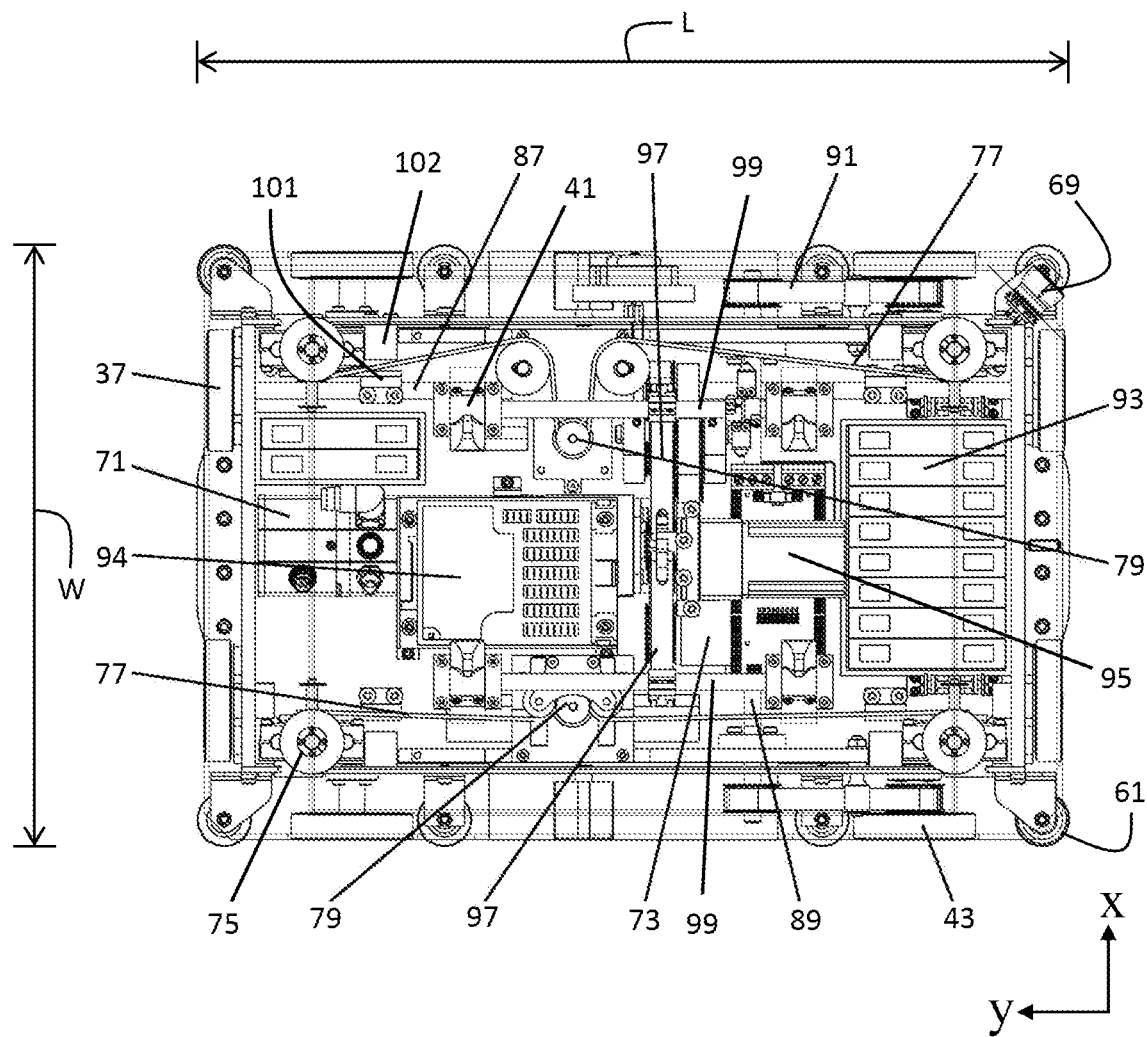
Figure 7:
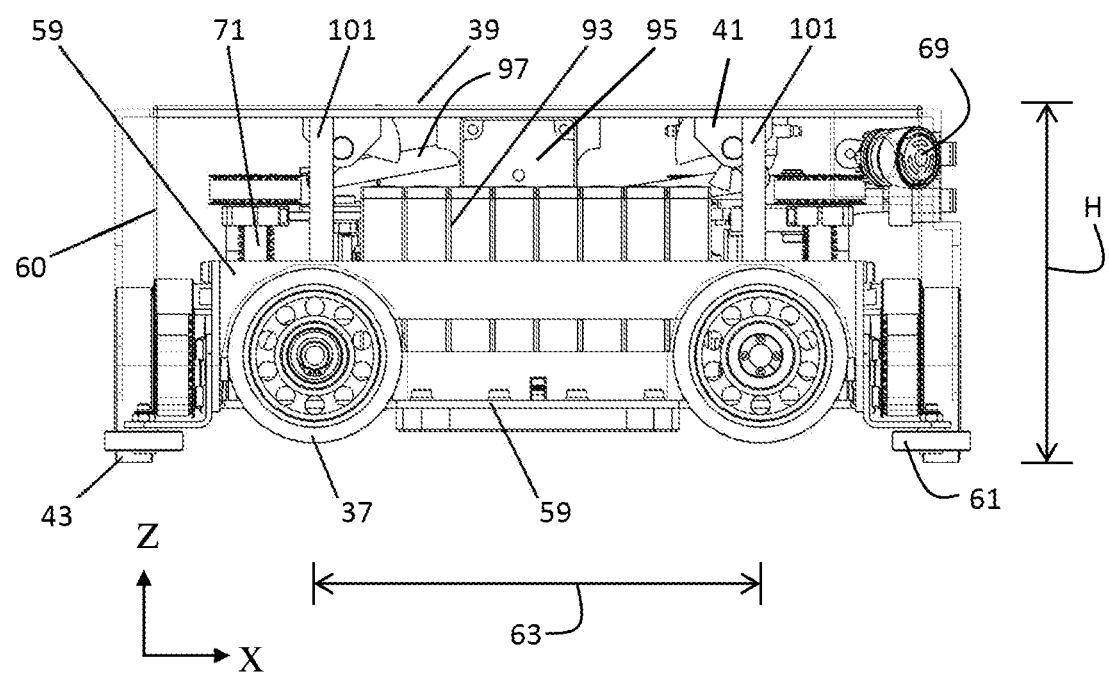
Figure 8:
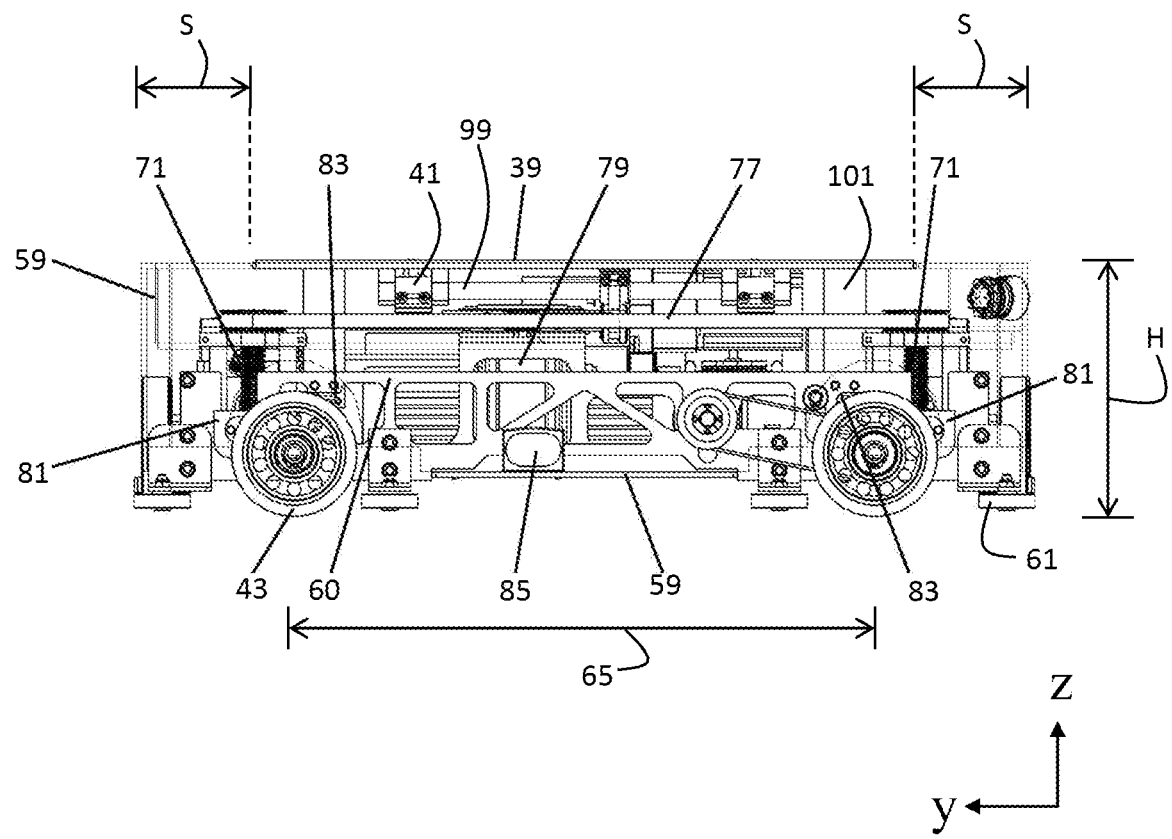
Figure 9A:
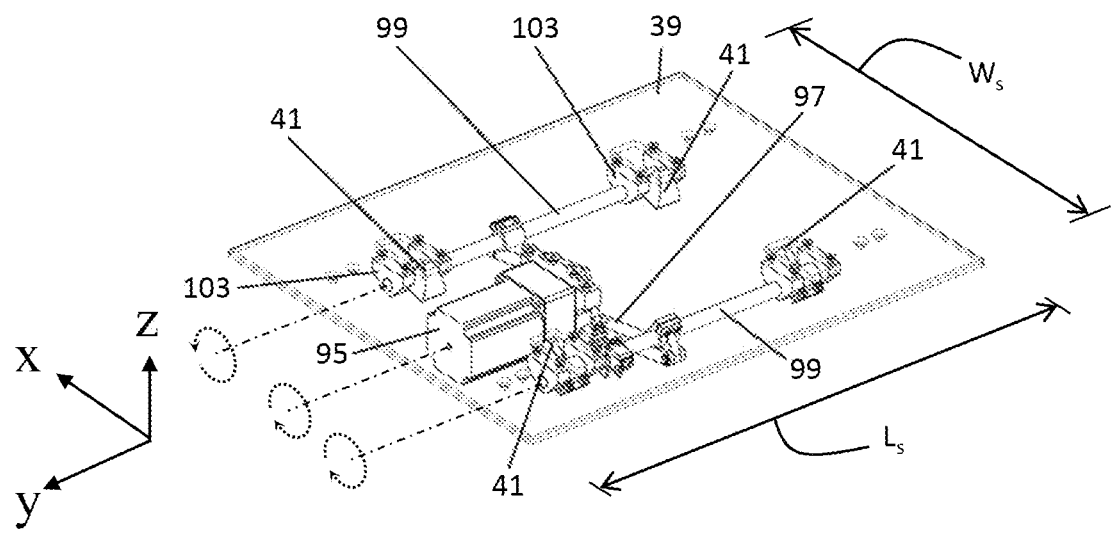
Figure 9B:
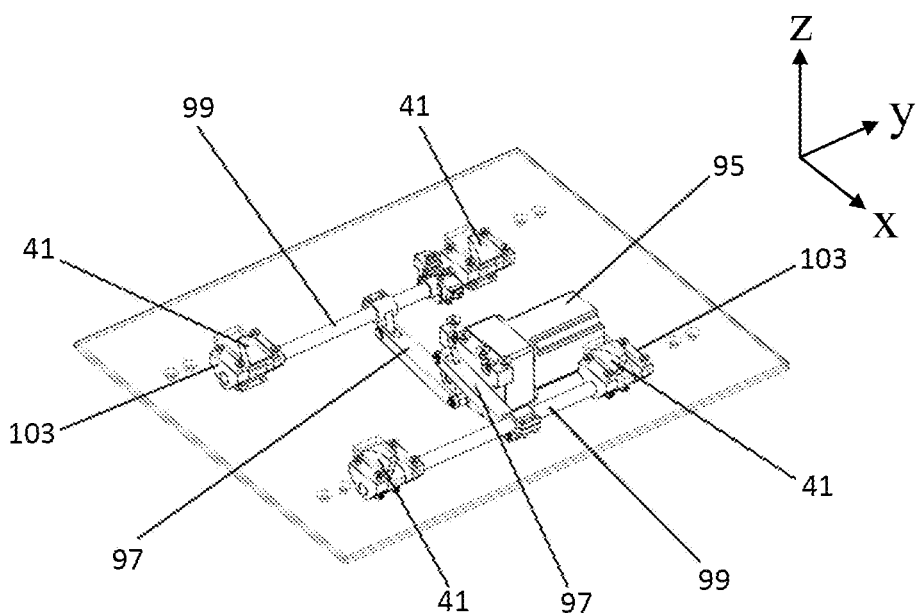
Figure 10A:
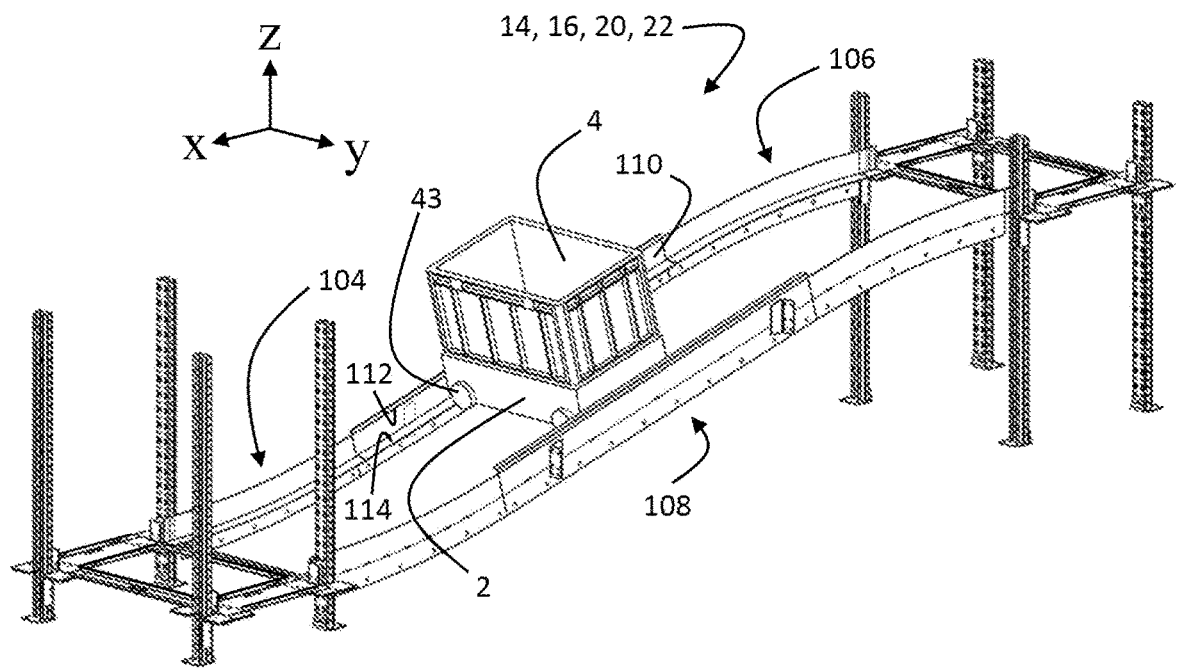
Figure 10B:
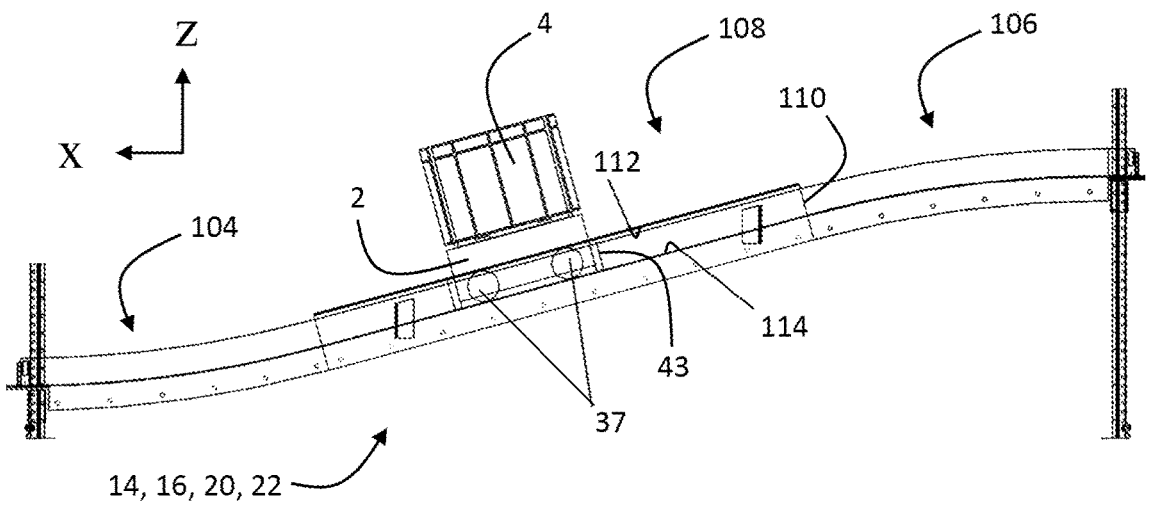
Figure 11:
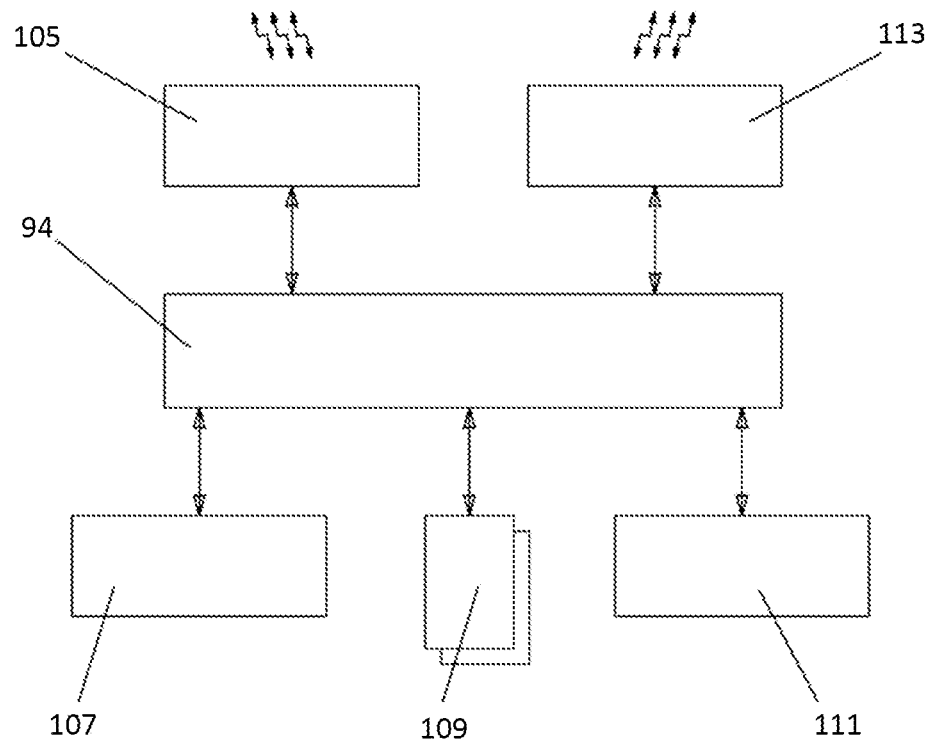

FIGS. 4*a* and 4*b* are perspective views on the carriage shown in FIGS. 2 and 3 with a lowered support surface (FIG. 4*a*) and a lifted support surface (FIG. 4*b*), respectively;

FIG. 5 is a perspective view on the carriage shown in FIGS. 2-4 with a casing shown transparently;

FIG. 6 is a top view on the carriage shown in FIGS. 2-5 with a casing and support surface shown transparently;

FIG. 7 is a side view along the second axis of the carriage shown in FIGS. 2-6 with a casing transparently;

FIG. 8 is a side view along the first axis of the carriage shown in FIGS. 2-7 with a casing transparently;

FIGS. 9*a* and 9*b* are perspective views on the support surface and the securing and centering system of a carriage shown in FIGS. 2-8;

FIGS. 10*a* and 10*b* are a perspective view and a front view, respectively, of another embodiment of a carriage according to an embodiment of the present disclosure on a ramp; and FIG. 11 is a schematic diagram of a control system of a carriage shown in FIGS. 2-9.

DESCRIPTION OF PREFERRED EMBODIMENTS

FIG. 1 shows an automated storage system 25 according to an embodiment of the present disclosure. The automated storage system 25 comprises a track arrangement 1 arranged in and/or at a rack arrangement 3, in particular at a front face 32 of the rack arrangement 3, and a plurality of self-driven carriages 2. The track arrangement 1 is configured so that a plurality of self-driven carriages 2 can drive along the track arrangement 1, e.g. by comprising tracks having a track width that allows an efficient and stable driving of the carriages 2. The storage rack arrangement 3 is here relatively wide along a first axis x with nine racks 9 and eight aisles 9 between the racks 6. The storage rack arrangement 3 is also quite along a second axis y with 15 storage sites 6 arranged along the aisles 9. The storage rack arrangement 3 is thus arranged on a grid with 15 storage rows along the second axis y. As six of the racks 9 comprises two storage sites 6 along the first axis x and three of the racks 9 comprises four storage sites 6 along the first axis x, there are in total 24 storage rows along the first axis x and five storage levels along the vertical axis z, i.e. k=5. The total number of storage sites 6 is thus 1,800.

The storage rack arrangement 3 for automatically storing and accessing containers 4 comprises a plurality of storage sites 5 being arranged in a plurality of racks 6 extending over a plurality of k storage levels. The storage sites 5 are accessible by horizontal aisle tracks 8 on each storage level, wherein the aisle tracks 8 extend in an aisle direction y along aisles 9 between the racks 6. The racks 6, the aisles 9, and the aisle tracks 8 extend parallel to each other so that the aisle directions y of any pair of adjacent aisles 9 are parallel to each other. Preferably, the storage sites 5 are arranged on a three-dimensional grid. All figures comprise a right-handed Cartesian coordinate system with a vertical z-axis, a forward y-axis, and a lateral x-axis. Therefore, the aisle direction y is directed along the y-axis. The positive y-axis shall mean herein a "forward" longitudinal direction, whereas the negative y-axis shall mean a "backward" longitudinal direction. Analogously, the positive x-axis shall mean a lateral direction "to the left", whereas the negative x-axis shall mean a lateral direction "to the right". Analogously, the positive z-axis shall mean an "upward" vertical direction, whereas the negative z-axis shall mean a "downward" vertical direction.

The track arrangement 1 connects each storage site 5 with an interaction site 10 for automatically processing stored containers 4 and/or automatically issuing containers 4 to be stored. The track arrangement comprises in this embodiment as many track levels as storage levels, i.e. Y=k, wherein the track levels correspond to the storage levels. The interaction site 10 is arranged at a track level that may be denoted as "interaction site level". In an alternative embodiment, the track arrangement 1 can comprise a plurality of interaction sites 10 and/or can connect each storage site 5 with a plurality of interaction sites 10. This can improve the throughput of the automated storage system 25 and provide shorter paths between an interaction site 10 and any of the storage sites 5.

As shown in FIG. 1, the track arrangement 1 comprises first one-way ramps 14, sec- and one-way ramps 16, third one-way ramps 20, and fourth one-way ramps 22 so that any pair of adjacent storage levels is connected with each other. Advantageously, the first, second, third, and fourth one-way ramps 14, 16, 20, 22 connect all Y track levels of the rack arrangement 3. Thereby, a carriage 2 can reach any storage level from an adjacent storage level 7.

The track arrangement 1 comprises a horizontal bi-directional track 11 connectable to all aisle tracks 8 on each storage level along a first axis x, Alternatively, instead of one horizontal bi-directional track 11 there may be two parallel horizontal one-way tracks with mutually opposite driving directions along the first axis x. The aisle tracks 8 are bidirectional tracks extending along a second axis y extending transverse to the first axis x. In an alternative embodiment, instead of one bi-directional aisle track 8, the track arrangement 1 may comprise two parallel one-way aisle tracks 8 with mutually opposite driving directions along the second axis y.

The track arrangement 1 comprises a plurality of connection tracks 31 providing connections between the aisle tracks 8 and the first horizontal one-way track 11 and/or the second horizontal one-way track 12. The connection track 31 serves as a track junction at one or more connection points 24 and is configured to being traversed by a carriage 2, wherein the carriage 2 can keep and/or change its driving direction, preferably by 90 degrees, 180 degrees and/or 270 degrees at any of the connection points 24. The connection tracks 31 are in this embodiment unidirectional, but one or more of the connection tracks 31 may be bidirectional in other embodiments. The connection tracks 31 may be composed of a plurality of connection points 24.

The connection tracks 31 each comprise a plurality of connection points 24 to connect the horizontal tracks 11, 12 and/or the one-way ramps 14, 16, 20, 22 with each other. One of the connection tracks 31 extends along the second axis y from the horizontal track 11 and the exit point 28 to the entry point 27. Thereby, the connection track 31 connects the first horizontal track 11, the exit point 28, and the entry point 27, so that a carriage 2 can move from one of said tracks 11 and/or one-way ramps 14, 16, 20, 22 to another.

All first one-way ramps 14 and second one-way ramps 16 lead toward an entry point level 17 (not indicated in FIG. 1*a*) of the at least one interaction site 10. All third one-way ramps 20 and fourth one-way ramps 22 lead away from an exit point level 18 (not indicated in FIG. 1*a*) of the at least one interaction site 10. The interaction site 10 can be accessed from the entry point level 17 and left from the exit point level 18. The entry point level 17 is the track level at which the interaction site 10 can be reached by a carriage 2. In this embodiment, a carriage 2 can reach the interaction site 10 from the entry point level 17 without changing the track level on which it drives, i.e. the entry point level 17 is the interaction site level. The entry point level 17 and the exit point level 18 are here identical for the interaction site 10, i.e. the entry point 27 and the exit point 28 are arranged at the same track level, namely at the track level at which the interaction site 10 is arranged, i.e. the interaction site level.

In this embodiment, the exit point level 18 is the track level from where the track level, at which the interaction site 10 is arranged, can be left via a third one-way ramp 22 and a fourth one-way ramp 22. The first one-way ramp 14 and the second one-way ramp 16 that leads to the entry point level 17 connects an adjacent track level with the entry point level 17 at an entry point 27 of the interaction site 10 from which the interaction site 10 can be reached by a carriage 2. The entry point 27 is arranged at the entry point level 17. The exit point level 18 is connected at an exit point 28 of the interaction site 10 via a third one-way ramp 20 and a fourth one-way ramp 22 to an adjacent track level 7, wherein the exit point 28 is arranged in the exit point level 18.

Figure 1A:
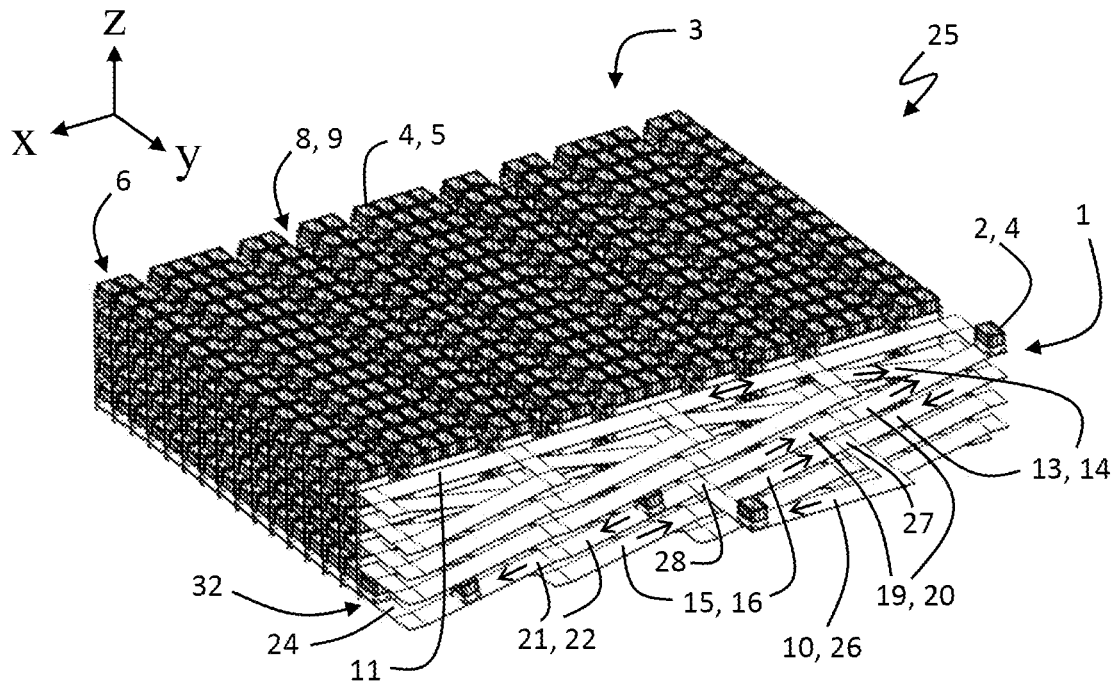
FIGS. 1a and 1b are two examples of an automated storage system according to an embodiment of the present disclosure.

As also shown in FIG. 1a, the first one-way ramps 14 comprise a first sequence of first ramps 13, the second one-way ramps 16 comprise a second sequence of second ramps 15, the third one-way ramps 20 comprise a third sequence of third ramps 19 and/or the fourth one-way ramps 22 comprise a fourth sequence of fourth ramps 21. Subsequent one-way ramps 14, 16, 20, 22 of the first, second, third or fourth sequence of ramps 13, 15, 19, 21, respectively, are connected to each other by one or two horizontal connection points 24. In this embodiment, the third or fourth sequence of ramps 19, 21 is arranged so that a carriage 2 can traverse any of said sequence of ramps 19, 21 without turns of 180 degrees between ramps. The same applies for the second sequence upward to the entry point 27. However, the first sequence downward toward the entry point includes a turn of 180 degrees at the fourth track level. This is, because the available lateral space does not allow for a wider track arrangement, i.e. for another track column at the right end.

The self-driven carriages 2 are configured to drive a defined first path along horizontal track 11 and first and second one-way ramps 14, 16 of the track arrangement 1 for automatically transporting a stored container 4 from a storage site 5 to an interaction site 10. The self-driven carriages 2 are configured to drive a defined second path along the one-way tracks 11 and third and fourth one-way ramps 20, 22 of the track arrangement 1 for automatically transporting a container 4 from the interaction site 10 to a storage site 5. Therein, the first path and the second path can comprise common tracks 11 but no common ramps. Preferably, the automated storage system 25 comprises a one or a plurality of carriages 2.

At any storage level 7, the horizontal track 11 enables a carriage 2 to move, on the same storage level 7, from any aisle track 8 to another aisle track 8. The bidirectional horizontal track 11 extends transversely to the aisle direction y. The bidirectional horizontal track 11 is arranged, in the aisle direction y, between the aisle tracks 8 and the first, second, third, and/or fourth one-way ramps 14, 16, 20, 22. In the aisle direction y, the track arrangement 1 extends with a depth in y-direction of three track widths, i.e. the width of three connection points 24.

The bidirectional horizontal track 11 is bidirectional to provide short paths between the interaction site 10 and any of the storage sites 5. In an alternative embodiment, the track arrangement 1 comprises first and second horizontal one-way tracks instead of one bidirectional horizontal track 11 to prevent any potential collision of carriages 2 when moving along the said track and/or to provide a unique first path and/or second path.

The track arrangement 1 comprises a plurality of first sequences 13 of first one-way ramps 14, a plurality of second sequences 15 of second one-way ramps 16, a plurality of third sequences 19 of third one-way ramps 20, and a plurality of fourth sequences 21 of fourth one-way ramps 22. Thereby, the track arrangement 1 comprises a plurality of first paths from any of the storage sites 5 to the interaction site 10, and a plurality of second paths from the interaction site 10 to any of the storage sites 5. This can increase the possible throughput of the automated storage and retrieval system 25.

In FIG. 1a, the interaction level is the third level with the entry point 27 and an exit point 28 on the third level. The track arrangement 1 comprises a plurality of first, second, third, and fourth sequences of one-way ramps 13, 15, 19, 21, wherein each sequence comprises two one-way ramps 14, 16, 20, 22 to reach all five levels of the track arrangement. The second sequence 15 comprises two second one-way ramps 16 directed upward to the right and arranged in the same track row below and left of the entry point 27. The third sequence 19 comprises two third one-way ramps 20 directed upward to the right and arranged in the same track row track row above and right of the exit point 28. The fourth sequence 21 comprises two fourth one-way ramps 22 directed downward to the left and arranged in the same track row below and right of the exit point 28. The first sequence 13 differs from the other sequences 15, 19, 21 in that there is not sufficient lateral space to right from the entry point for the carriage to descend from the fifth top level. Therefore, one first one-way ramp 14 of the first sequence 1 between the fourth and third level is directed downward to the left and arranged above and right of the entry point 27 in the same track row of the entry point 27. The other first one-way ramp 14 of the first sequence 13 between the fifth and fourth level is directed downward to the right and arranged in a different track row than the entry point 27. Therefore, the path of a carriage along the first sequence 13 implies a 180-degree turn between the two first one-way ramps 14. The available lateral space and the position of the entry point 27 and/or exit point 28 in the track arrangement 1 determine if and how many such 180-degree turns may be needed in which sequence. The layout of the track arrangement 1may be chosen to minimise the number of 180-degree turns as much as possible. However, if need be, the first, second, third, and/or fourth sequences 13, 15, 19, 21 may comprise a plurality of 180-degree turns and may thus define a zig-zag-shaped path.

In the embodiments of FIGS. 1a,b, the track arrangement 28 is arranged on a three-dimensional grid, wherein the connection points 24, entry point 27 and/or exit point 28 define grid points. The grid comprises Z track levels, Y track rows, and X track columns. The track rows extend transverse to the aisle direction y (along x-axis), so that a sequence of track rows extends in the aisle direction (along y-axis). The track columns are defined by a sequence of connection points 24 vertically arranged above each other (along z-axis), so that a sequence of track columns extends transverse to the aisle direction (along x-axis). The one-way ramps 14, 16, 20, 22 connect adjacent track columns and levels which each other. The number Z of track levels equals here the number k of storage levels 7, i.e. k=5 in FIG. 1a. The number of track rows Y equals the maximum number of connection points 24 of a connection track 31 in aisle direction y, i.e. Y=3 in FIG. 1a. Additionally, some space in aisle direction y, may be provided for arranging the interaction track 26 and the interaction site 10. In FIG. 1*a*, the number X of track columns equals the number Z of track levels. This is particularly advantageous to reduce the number of needed 180-degree turns. However, the carriages 2 may only be able to securely climb/descend ramps with a slope angle of less than $\alpha_{max}$, so that a minimum track column distance $D_{min}$ may be needed to climb one level height H, wherein $$D_{min} = \frac{\tan \alpha_{max}}{H}.$$

If the available lateral space does not allow a layout of the track arrangement with at least Z track columns, the number X of track columns can be reduced down to a minimum number X of 2 at the cost of more 180-degree turns. Preferably, the driving direction of ramps of the same track row connecting the same track columns alternates between adjacent levels. Preferably, the driving direction of ramps between the same levels and connecting the same track columns differs between the track rows. Preferably, the driving direction of ramps connecting the same levels in the same track row alternates between adjacent track columns.

The number Y of track rows is counted from the front face 32 of the rack arrangement 3 forward in x-direction, so that the bidirectional horizontal track 11 in FIG. 1*a* is arranged in track row number one. The number Z of track levels equals the number k of the storage levels 7, wherein the bottom storage level has level number one and the top level has level number five in FIG. 1*a*. In FIG. 1*a*, the number of track columns X is five, wherein the first track column on the right is track column number one, the entry point 27 is in track column number two, and the exit point 28 is in the central third track column. Preferably, the entry point 27 and the exit point 28 are arranged in adjacent track columns. Preferably, the entry point 27 and the exit point 28 are arranged on the same track level.

In all shown embodiments, the ramps of the same track row are arranged essentially in parallel to each other, i.e. each extending from bottom left to top right or vice versa, or each leading from top left to bottom right or vice versa. In FIG. 1*a*, all ramps of the second track row lead from top left to bottom right between adjacent levels and track columns. Analogously, all ramps of the third track row lead from bottom left to top right between adjacent levels and track columns. In FIG. 1*a*, only 8 one-way ramps 14, 16, 20, 22 in total would at least be required to connect the entry point 27 and the exit point 28 with any track level. Seven of those one-way ramps 14, 16, 20, 22 are arranged in the third track row and one first one-way ramp 14 between the fifth and the fourth track level and the first and second track column. If there was enough lateral space for another track column right to the first track column, all 8 one-way ramps 14, 16, 20, 22 could have been arranged in the same track row, so that the second track row would not be necessary altogether. FIG. 1*a* shows 32 ramps in total, of which 16 ramps are arranged in the second track row and 16 ramps are arranged in the third track row. Therefore, the embodiment of FIG. 1*a* comprises a redundancy of 24 additional ramps that provide alternative options for paths to the entry point 27 or from the exit point 28. This may reduce the risk of congestions and allow for more traffic, i.e. for more carriages 2 to be operated simultaneously. Moreover, the track arrangement 1 of FIG. 1*a* could allow for up to three more interaction sites 10 to be served in parallel. For instance, another interaction site could be arranged on the third track level between the fourth and fifth track column, and/or on the first and/or fifth track level between the second and third track column and/or between the fourth and fifth track column.

Figure 1B:
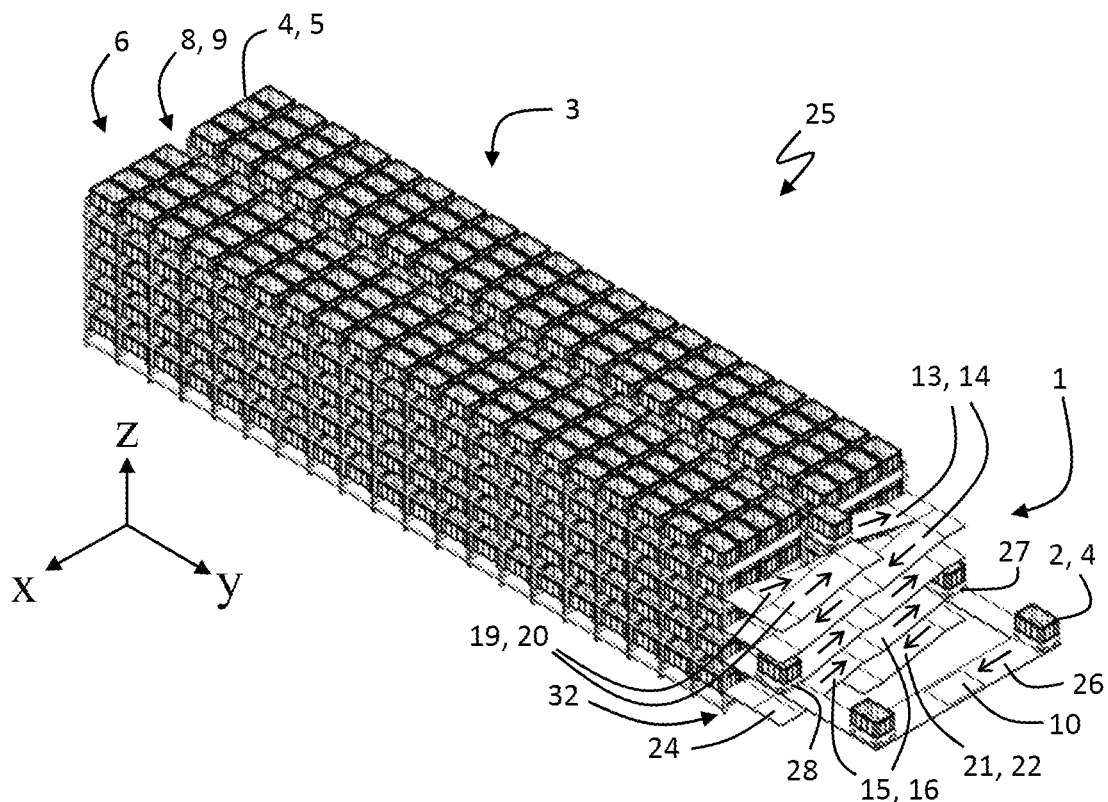

FIG. 1*b* shows a perspective view of another embodiment of an automated storage system 25 according to the present disclosure. The storage rack arrangement 3 is here relatively narrow along the first axis x with only two racks 6 and one aisle 9 between the racks 6. The storage rack arrangement 3 is relatively long along the second axis y with 20 storage sites 6 arranged along the aisle 9. Analogous to the track arrangement 1, the storage rack arrangement 3 is arranged on a grid with 20 storage rows along the second axis y, eight storage rows along the first axis x and five storage levels along the vertical axis z, i.e. k=5. The total number of storage sites 6 is thus 800.

The track arrangement 1 as shown in FIG. 1*b* has nine track levels, three track columns and two track rows to serve one interaction site 10 at the second track level via interaction track 26. The track arrangement 1 is particularly useful for narrow storage rack arrangements 3 with limited lateral space. The storage rack arrangement 3 has only 5 storage levels, but the track arrangement 1 comprises four additional auxiliary intermediate track levels between the track levels 1-2, 3-4, 5-6 and 7-8. The track arrangement 1 thus comprises 16 relatively short one-way ramps 14, 16, 20, 22 that each climb only half a storage level to keep the slope angle below the maximum slope angle $\alpha_{max}$, i.e. the track level distance of the track arrangement 1 is here half the storage level height. Five first ramps 14 connect track levels 8-3 downward, three second ramps 16 connect track levels 1-3 upward, five third ramps 20 connect track levels 3-8 upward, and three fourth ramps 22 connect track levels 3-1 downward. The path along a sequence of ramps 14, 16, 20, 22 may include a zig-zag sequence with one or more 180-degree turns at the lateral ends, i.e. at the first and third column. A central connection track 31 at the second track column leads into central aisle tracks 8. The first and third track column are auxiliary track columns with connection points 24 at the auxiliary intermediate track levels, where the carriages 2 can make a 180-degree turn to climb or descend a track level upward or downward. In this embodiment, horizontal tracks 11, 12 with a driving direction transverse to the aisle direction y can be dispensed with, because the storage rack arrangement has only one aisle 9. At any storage level 7, the aisle tracks 8 are connected by the one-way ramps 14, 16, 20, 22 to the interaction track 26. In the aisle direction y, the track arrangement 1 extends by the width of two connection points 24 away from the front face 32 of the rack arrangement 3.

Any of the described track arrangements 1 is arranged so that the track arrangement 1 can be extended arbitrarily by reproducing the shown track arrangement 1 and/or a section thereof along the first axis x, periodically. This makes the track arrangement 1 modular and adaptable to the size of the storage rack arrangement 3.

FIG. 2 shows a carriage 2 carrying a container 4 on a connection point 24 in more detail. The carriage 2 has essentially a box shape with a certain width W along the first axis x, a certain length L along the second axis y and a certain height H along the vertical axis z. The container 4 has only slightly smaller dimensions along the first axis x and the second axis y, but is significantly higher along the z-axis. The container 4 is placed on top of the carriage 2 which thereby carries the container 4. The container is secured and centred on a top support surface 39 of the carriage 2 by means of a securing and centering system comprising engaging elements 41 described in more detail with reference to FIGS. 9*a*, 9*b*. The top support surface 39 of the carriage 2 is vertically movable to lift and lower the container 4. FIG. 2 shows the support surface 39 in a lifted position.

The carriage 2 is able to drive "laterally" on first rail tracks 36 extending along the first axis x by using a first wheel set 37 of four wheels and "longitudinally" on second rail tracks 42 extending along the second axis y by using a second wheel set 43 of four wheels. Thus, the carriage 2 comprises eight wheels in total. The wheels of the first wheel set 37 are arranged at a front side 47 and a back side 49 (not visible in FIG. 2) of the carriage 2. The wheels of the second wheel set 43 are arranged at a left side 51 (not visible in FIG. 2) and a right side 53 of the carriage 2. The carriage 2 is significantly longer along the second axis y than wide along the first axis x. Similarly, the wheel base of the first wheel set 37 is significantly shorter than the wheel base of the second wheel set 43. Accordingly, a first track gauge 55 of the first rail tracks 36 is significantly larger than a second track gauge 57 of the second rail tracks 38. The first rail tracks 36 may be part of the ramps 14, 16, 20, 22, the horizontal tracks 11 and installed within the racks 8 along the x-axis for the carriages 2 to enter the racks 8. The second rail tracks 38 may be part of the aisle tracks 8. The connection points 24 may comprise both first rail tracks 36 and second rail tracks 38 crossing each other.

In the shown embodiment, the first wheel set 37 is mounted on a first chassis 59 of the carriage 2, whereas the second wheel set 43 is vertically movable between a driving position and an idle position relative to the first chassis 59 of the carriage 2. Thus, the second wheel set 43 is vertically movable relative to the first wheel set 37. The lower one of the first wheel set 37 and the second wheel set 43 is in the driving position and the upper one of the first wheel set 37 and the second wheel set 43 is in the idle position. In fact, the first wheel set 37 is lifted together with the first chassis 59 when the second wheel set 43 is in the driving position and moved downward. In an alternative embodiment, only the first wheel set 37 or both wheel sets 37, 43 may be vertically movable relative to the first chassis 59 of the carriage 2. The second wheel set 43 is preferably mounted to a second chassis 60, wherein the first chassis 59 and the second chassis 60 are movable relative to each other (see FIG. 5).

The carriage 2 further comprises guiding elements 61 in form of a plurality of pulleys that are rotatable about a vertical axis z and arranged at the front side 47, the back side 49, the left side 51 and the right side 53 of the carriage 2. At least a subset of the pulleys may be arranged at the four vertical edges of the carriage 2 to serve as a guiding element 61 for both driving along the first axis x and driving along the second axis y. The guiding elements 61 partly protrude outwardly relative to the respective front side 47, back side 49, left side 51 or right side 53 they are arranged at, so that the pulleys can roll along vertical guiding surfaces provided by the first rail tracks 36 and second rail tracks 38, respectively. Thereby, the carriage 2 is able to smoothly and efficiently drive along the first rail tracks 36 and the second rail tracks 38, respectively. The pulleys may be spring-loaded outwardly to centre the carriage 2 on the first rail tracks 36 and the second rail tracks 38, respectively.

The first wheel set 37 has a relatively short first wheel base 63. This is advantageous for entering and leaving, with a sufficient ground clearance, the ramps 14, 16, 20, 22 that extend laterally along the first axis x. The second wheel set 43 has a relatively long second wheel base 65. This is advantageous for driving quickly on the aisle tracks 8 that extend longitudinally along the second axis y between the racks 6.

FIG. 3 shows a view on the back side 49 of the carriage 2 carrying the container 4 on the lifted support surface 39. The carriage 2 has a height H when the support surface 39 is lowered. The support surface 39 is essentially vertically movable by a range d above the height H. The container has height h, wherein h>H. Therefore, the maximal height of the carriage 2 carrying the container 4 is H+d+h, when the support surface 39 is lifted. Therefore, the minimal height of the carriage 2 carrying the container 4 is H+h, when the support surface 39 is lowered. The vertical position of the support surface 39 defines the total height H+d of the carriage 2 by comprising at least three contact points for supporting the container 4 from below. In FIG. 3, the first wheel set 37 is lower than the second wheel set 43, i.e. the first wheel set 37 is in the driving position for driving laterally along the first axis x.

FIGS. 2 and 3 also show how the securing and centering system of the carriage 2 works. The securing and centering system comprises in this embodiment two pairs of corresponding engaging elements 41. They are arranged at the support surface 39 in such a way that they are able to engage with receiving elements 41 at the bottom of the container 4. The engaging elements 41 of each pair are rotatable about the second axis y in mutually opposite directions, i.e. clockwise and counter-clockwise, respectively, (see dashed arrows in FIG. 3) so that they outwardly engage with the receiving elements 67. Engaging of the engaging elements 41 with the receiving elements 67 may include hooking the engaging elements 67 into the receiving elements 67. On the path between the idle position (see FIGS. 4*a*,*b*) and the securing position (as shown in FIG. 3), in case the container 4 is not exactly centred with respect to a symmetry plane yz of the carriage 2, one engaging element 41 of a pair may contact the container 4 before the other engaging element 41 of a pair. Further motion of the engaging elements 41 will push the container towards a laterally central position on the support surface 39. The container 4 is thereby both centred with respect to the symmetry plane yz of the carriage 2 and secured downwardly to the support surface 39.

The carriage 2 also comprises a sensor arrangement 69 arranged at the back-left edge of the carriage 2 and directed horizontally at an angle, e.g. 45 degrees, between the positive first axis x and the negative axis y. The track arrangement 1 may comprise optical markers, electrical tags and/or lane markings that the sensor arrangement 69 is configured to identify for determining the position of the carriage 2 in the track arrangement 1. The position of the sensor arrangement 69 at an edge of the carriage 2 and its angled directed orientation are advantageous to use a single sensor arrangement 69 for both determining the position along the first axis x and the position along the second axis y.

In FIG. 4*a*, the second wheel set 43 is lower than the first wheel set 37, i.e. the second wheel set 43 is in the driving position for driving longitudinally along the second axis y. The first wheel set 37 is in the idle position, but the wheels of the first wheel set 37 may be driven simultaneously to the wheels of the second wheel set 43. The support surface 39 is lowered and the engaging elements 41 are in the idle position. As can be better seen in FIG. 7, the engaging elements 41 are, in the idle position, fully positioned below the support surface 39, whereas they at least partly protrude above the support surface 39 when they are in the securing position (see FIG. 3).

In FIG. 4b, the first wheel set 37 is lower than the second wheel set 43, i.e. the first wheel set 43 is in the driving position for driving longitudinally along the first axis x. The second wheel set 43 is in the idle position, but the wheels of the second wheel set 43 may be driven simultaneously to the wheels of the first wheel set 37. The support surface 39 is lifted and the engaging elements 41 are in the idle position. It should be noted that the support surface 39 has a distance S to the longitudinal ends of the carriage 2 along the second axis y, i.e. to the front side 47 and to the back side 49. As shown in FIG. 2, the container 4 is longer along the second axis y that the support surface 39, so that a forward end portion of the bottom of the container 2 and a backward end portion of the bottom of the container 2 is not supported by the support surface 39. When the container 4 is stored at a storage site 5 of a rack 6, the container 4 preferably rests, with the forward end portion of the bottom of the container 2 and the backward end portion of the bottom of the container 2, on a pair of corresponding rack fillets extending along the first axis x. The corresponding rack fillets have a distance to each other that is greater than the length of the support surface 39. Thereby, the support surface 39 is able to pass between the rack fillets when it is lifted from a lowered position to a lifted position by the range d in order to lift the container 4 off the rack fillets for transport.

Some of the interior parts of the carriage 2 are visible in FIG. 5. The carriage 2 comprises a drive motor 71 for driving both the first wheel set 37 and the second wheel set 43. Both, the first wheel set 37 and the second wheel set 43 may be coupled to the drive motor 71 irrespective whether they are in the idle or driving position. This means that both wheel sets of the carriage 2 may be driven simultaneously, wherein the power consumption of driving the idle wheel set is marginal. However, the first wheel set 37 and the second wheel set 43 are preferably coupled to the drive motor 43 via a gear system providing different transmission ratios or gear ratios for the two wheel sets 37, 43. The carriage 2 thus comprises a gear system 73 (see FIG. 6), wherein the gear system 73 is operable with a first gear ratio and a second gear ratio. The gear system 73 is configured for driving the first wheel set 37 with the first gear ratio and for driving the second wheel set 43 with the second gear ratio, wherein the first gear ratio is significantly larger than the second gear ratio. This means that the wheels of the second wheel set 43 run significantly faster than the wheels of the first wheel set 37 at a given speed of the drive motor 71. This is particularly advantageous for quickly driving along the long aisle tracks 8 along the second axis y by driving with the second wheel set 37. Accordingly, the output torque of the wheels of the first wheel set 37 is significantly higher than the output torque of the wheels of the second wheel set 43. This is particularly advantageous for climbing the ramps 14, 16, 20, 22 along the first axis x by driving with the first wheel set 37. Preferably, the first wheel set 37 and/or the second wheel set 43 are driven as a four-wheel drive.

The second chassis 60, on which the second wheel set 43 is mounted, is vertically movable by four vertically extending leadscrews 75 arranged close to the four vertical edges of the carriage 2. The leadscrews 75 are mechanically coupled via transmission belts 77 to a pair of lift motors 79 (see FIG. 6) for simultaneously driving all four leadscrews 75. The leadscrews 75 are mounted on the first chassis 59 and the second chassis 60 is mounted to the leadscrews 75 by lifting elements 81 engaging with an outer thread of the leadscrews 75 and thereby vertically moving upon rotation of the leadscrews 75. The carriage 2 further comprises vertically acting springs 83 that are expanded upon a downward movement of the second chassis 60 relative to the first chassis 59 and released upon an upward movement of the second chassis 60 relative to the first chassis 59. The springs 83 thus preloaded for pulling the second chassis 60 upward. The carriage 2 further comprises at least one detector element 85 for detecting other carriages 2 or obstacles in the path along the first axis x and for avoiding collisions.

As shown in FIG. 6, a first output of the gear system 73 is mechanically coupled to the two wheels of first wheel set 37 arranged on the left-hand side of the carriage 2 by at least one first drive shaft 87 extending along the second axis y. Analogously, a second output of the gear system 73 is mechanically coupled to the two rear wheels of the second wheel set 43 by at least one second drive shaft 89 extending along the first axis x.

The rear wheels of the second wheel set 43 are coupled to the second drive shaft 89 by means of a transmission belt 91 so that the second wheel set 43 can be driven at any vertical position of the second chassis 60 relative to the first chassis 59. The carriage 2 further comprises a rechargeable battery 93 in form of a stack of battery modules for supplying the carriage 2 with electrical power. The carriage 2 further comprises a control system 94 comprising hardware in form of control electronics on one or more printed circuits boards (PCBs) and software configured to control the carriage 2. The details of how the control system 94 works and is connected for executing the method for automatically storing and/or retrieving containers 4 in the racks 6 of the storage rack arrangement 3 is schematically displayed in FIG. 10.

FIG. 6 also shows the securing and centering system with the engaging elements 41. The carriage 2 comprises a securing motor 95 for actuating at least one first actuator shaft 97 extending essentially along the first axis x. The first actuator shaft 97 is mechanically coupled to a pair of second actuator shafts 99 extending along the second axis y. The second actuator shafts 99 is configured to drive the engaging elements between the idle position and the securing position by rotating about the second axis y, wherein one of the pair of actuator shafts 99 rotates clockwise while the other one of the pair of actuator shafts 99 rotates counter-clockwise. The details of the securing and centering system are better visible in FIG. 9a,b.

As shown in FIGS. 6 and 7, the support surface 39 is mounted on four vertical columns 101 that are vertically movable in parallel to each other. The lift motors 79 are used to drive the lifting motion of the support surface 39. The total vertical path of the lifting elements 81 along the leadscrews 75 has two path sections, i.e. a lower path section and an upper path section. In the lower path section, the lifting elements 81 are used for lifting/lowering of the second wheel set 43, and, in the upper path section, they are used for lifting/lowering of the support surface 39. Therefore, the lifting elements 81 mounted on the leadscrews 75 have a dual functionality, i.e. for pushing the second wheel set 43 downward against the springs 83 in the lower path section and for pushing the support surface 39 upward in the upper path section. The upper end of the springs 83 is mounted to a spring bracket 102, wherein the vertical location of the spring bracket 102 defines the transition between the lower path section and the upper path section. When the lifting elements 81 move upward from the lower path section towards the upper path section, the springs 83 are contracting and pulling the second wheel set 43 upward.

When the springs 83 are fully contracted, the second wheel set 43 has reached the idle position. The lifting elements 81 enter the upper path section upon further upward movement after the second wheel set 43 has reached the idle position. In the upper path section, the lifting elements 81 push the support surface 39 upward into a lifted position. This is particularly advantageous, because the lifted position of the support surface 39 is only needed when the second wheel set 43 is in the idle position.

FIGS. 9a,b show only the support surface 39 having a width $W_s$ and a length $L_s$ together with the securing and centering system, wherein FIG. 9a shows the engaging elements 41 being in the idle position and FIG. 9b shows the engaging elements 41 being in the securing position. The length L of the carriage 2 thus relates to the length of the support surface 39 by the formula $L=L_s+2 \cdot S$, wherein S is the distance of the support surface 39 to the longitudinal ends of the carriage 2, i.e. the front side 47 and the back side 49. The width $W_s$ of the support surface 39 is only slightly smaller than the width W of the carriage 2. The engaging elements 41 are arranged in two corresponding pairs of a left-hand side engaging element 41 and a right-hand side engaging element 41. The left-hand side engaging elements 41 are rotatable simultaneously to the right-hand side engaging elements 41, but in the opposite direction. This is achieved by a pair of first actuator shafts 97 acting as connection rods being hinged at diametrically opposite sides to a rotor axle of the securing motor 95 in a way similar to a crank shaft. The rotation of the securing motor 95 is thereby transformed into a mutually opposite pushing and pulling motion of the first actuator shafts 97 essentially along the first axis x. The laterally outer end of each first actuator shaft 97 is hinged from below to one of the pair of second actuator shafts 99 being rotatably mounted to the support surface 39 from below by brackets 103. The mutually opposite pushing and pulling motion of the first actuator shafts 97 rotates the second actuator shafts 99 in opposite directions (as indicted by the dashed arrows). The engaging elements 41 extend radially from the second actuator shafts 99 in form of hooks that are configured to project through openings in the support surface 39 when they are moved from the idle position into the securing position. Preferably, in the securing position, the hooks 41 hook into a corresponding recess in the receiving elements 67 to secure the container 4 safely against tipping over and slipping off the support surface 39. The engaging elements 41 do not project through the openings in the support surface 39 when they are in the idle position as shown in FIG. 9a. They are thus "stowed away" in the idle position (FIG. 9a). A mutually opposite pulling motion of the first actuator shafts 97 results in a simultaneous securing motion of the engaging elements 41 of about 90 degrees outward from the idle position (FIG. 9a) towards the securing position (FIG. 9b). A mutually opposite pushing motion of the first actuator shafts 97 results in a simultaneous unsecuring motion the engaging elements 41 of about 90 degrees inward from the securing position (FIG. 9b) towards the idle position (FIG. 9a). Preferably, the securing motor 95 is a step motor configured to drive selectively in two directions about a defined rotation angle of up to 180 degrees.

In the securing position of the engaging elements 41 shown in FIG. 9b, the hooks 41 are hooked into recesses 67 at the bottom of the container 4 (not shown in FIG. 9b) for securing the container 4 on the support surface 39. On the way from the idle position (FIG. 9a) towards the securing position (FIG. 9b), the hooks move essentially laterally outward after they have moved essentially upward to pass through the openings in the support surface 39. The outward movement of the hooks is used to centre the container 4 relative to the central symmetry plane yz before it is secured on the support surface 39.

FIGS. 10a,b show another embodiment of a carriage 2, wherein the wheels of the first wheel set 37 and the wheels of the second wheel set 43 extend at least partially out of the outer contour of the carriage 2, i.e. they are not fully embedded in the outer contour of the carriage 2 as shown in the embodiments of FIGS. 2-8. This is particularly useful for the first wheel set 37, because the ramps 14, 16, 20, 22 extend predominantly along the first axis x to climb a track level between two connection points 24.

The ramps 14, 16, 20, 22 may be shaped as shown in FIGS. 10a,b comprising a maximum slope angle of approximately 15 degrees. The ramps 14, 16, 20, 22 may comprise a lower concave portion 104 with a smoothly upwardly rising slope angle and an upper convex portion 106 with a smoothly upwardly falling slope angle. There may be a straight portion 108 with a constant maximum slope angle arranged between the lower concave portion 104 and the upper convex portion 106. Preferably, the lateral end points of the ramps 14, 16, 20, 22 have essentially zero slope angle where they connect to the connection points 24. This shape allows for a smooth change of the track level and reduces the risk of tipping over for the carriage 2 carrying the container 4.

The ramps 14, 16, 20, 22 may further comprise securing rails 110 comprising a securing surface 112 facing essentially downward and arranged at a distance to a running surface 114 of the first rail tracks 36. The distance is slightly larger than the diameter of the wheels of the first wheel set 37, so that the wheels of the first wheel set 37, that extend forwardly and backwardly out of the contour of the of the carriage 2, are able to run on the running surface 114 below the securing surface 112. The securing rails 110 have here a C-profile partly embracing the wheels of the first wheel set 37. The securing rails 110 here extend along the straight portion 108 having the constant maximum slope angle so that tipping over of the carriage 2 is prevented where the slope angle is largest. If the carriage 2 carrying the container 4 starts tipping over, for instance due to momentum of container load sliding downwards within the container 4, the wheels of the first wheel set 37 may shortly lift off from the running surface 114 of the first rail tracks 36 to abut against the securing surface 112. The wheels of the first wheel set 37 will then return downwards to run on the running surface 114 again. Thus, the securing rails 110 secure the carriage 2 on steep portions of the ramps 14, 16, 20, 22.

FIG. 11 shows how the control system 94 is connected to other components and modules for controlling the carriage 2. The other components and modules may be implemented by hardware inside and/or outside the carriage 2. Alternatively, or in addition, the other components and modules may be implemented by executable software installed inside and/or outside the carriage 2. For instance, the control system 94 may be signal connected to an interface module 105 for communicating with an external main control system of the storage system 25. The control system 94 may receive commands and/or information from the main control system of the storage system 25 via the interface module 105. The control system 94 may send status reports, position information, warnings, failures or other information to the main control system of the storage system 25 via the interface module 105. The interface module 105 preferably provides for a wireless communication connection.

The control system 94 is further signal connected to a drive module 107 for controlling the drive motor 71, one or more lift modules 109 for controlling the one or more lift motors 79, and a securing module 111 for controlling the securing motor 95. The control system 94 is further signal connected to a detector module 113 for communicating with the at least one detector element 85 and/or the sensor arrangement 69. The control system 94 may thus receive signals from the detector element 85 and/or the sensor arrangement 69 indicative of information about the own position of the carriage 2 and the position and/or driving direction and/or speed of other carriages in the vicinity.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 track arrangement
2 carriage
3 storage rack arrangement
4 container
5 storage site
6 rack
8 aisle track
9 aisle
10 interaction site
11 horizontal track
13 first sequence of first one-way ramps
14 first one-way ramp
15 second sequence of second one-way ramps
16 second one-way ramp
19 third sequence of third one-way ramps
20 third one-way ramp
21 fourth sequence of fourth one-way ramps
22 fourth one-way ramp
24 connection point
25 automated storage system
26 interaction track
27 entry point
28 exit point
11 horizontal track
31 connection track
32 front face
36 first rail tracks
37 first wheel set
38 second rail tracks
39 support surface
41 engaging element
43 second wheel set
47 front side of carriage
49 back side of carriage
51 left side of carriage
53 right side of carriage
55 first track gauge
57 second track gauge
59 first chassis
60 second chassis
61 guiding element
63 first wheel base
65 second wheel base
67 receiving element
69 sensor arrangement
71 drive motor
73 gear system
75 leadscrew
77 transmission belt
79 lift motor
81 lifting element
83 spring
85 detector element
87 first drive shaft
89 second drive shaft
91 transmission belt
93 battery
94 control system
95 securing motor
97 first actuator shaft
99 second actuator shaft
101 vertical column
102 spring bracket
103 bracket
104 lower concave portion
105 interface module
106 upper convex portion
107 drive module
108 straight portion
109 lift module
110 securing rails
111 securing module
112 securing surface 113 detector module
114 running surface
x first axis
y second axis
z vertical axis
X number of track columns
Y number of track rows
Z number of track levels
h height of container
H height of carriage
d range of support surface lift
S distance of support surface to longitudinal ends of carriage
$W_s$ width of support surface
$L_s$ length of support surface

The invention claimed is:

1. A self-driven carriage for automatically storing and accessing containers in a storage rack arrangement, the carriage comprising:
a first wheel set for driving along a first axis;
a second wheel set for driving along a second axis extending transverse to the first axis, wherein at least one of the first wheel set and the second wheel set is vertically movable between a driving position and an idle position, wherein the lower one of the first wheel set and the second wheel set is in the driving position and the upper one of the first wheel set and the second wheel set is in the idle position;
a support surface for carrying a bottom surface of a container; and
a centering and securing system configured to center and secure the container on the support surface, wherein the centering and securing system comprises at least two engaging elements simultaneously movable in opposite directions to each other between an idle position and a securing position, wherein the engaging elements are configured to engage, in the securing position, with the container for securing the container on the support surface, the first wheel set and/or the second wheel set being vertically movable by at least one lift motor, wherein the support surface is vertically movable, by the at least one lift motor, relative to the lower one of the first wheel set and the second wheel set.

2. The self-driven carriage according to claim 1, wherein the engaging elements are positioned below the support surface in the idle position and above the support surface in the securing position.

3. The self-driven carriage according to claim 1, wherein the engaging elements are mechanically coupled with each other and driven by one securing motor.

4. The self-driven carriage according to claim 1, wherein the support surface is vertically movable relative to the lower one of the first wheel set and the second wheel set being in the driving position.

5. The self-driven carriage according to claim 1, wherein the support surface has a distance to the ends of the carriage along the second axis.

6. The self-driven carriage according to claim 1, wherein the first wheel set and the second wheel set are driven by one drive motor.

7. The self-driven carriage according to claim 6, wherein the first wheel set and the second wheel set are driven simultaneously when the lower one of the first wheel set and the second wheel set is in the driving position and the upper one of the first wheel set and second wheel set is in the idle position.

8. The self-driven carriage according to claim 6, wherein the first wheel set and the second wheel set are mechanically coupled to the drive motor by a gear system, wherein the gear system is operable with a first gear ratio and a second gear ratio, wherein the gear system is configured for driving the first wheel set with the first gear ratio and for driving the second wheel set with the second gear ratio, wherein the first gear ratio is at least two times larger than the second gear ratio.

9. The self-driven carriage according to claim 1, wherein the centering and securing system comprises at least one securing motor for simultaneously moving the at least two engaging elements in opposite directions to each other between the idle position and the securing position.

10. The self-driven carriage according to claim 1, wherein the first wheel set has a first wheel base and the second wheel set has a second wheel base, wherein the second wheel base is larger than the first wheel base.

11. The self-driven carriage according to claim 1, wherein a length of the carriage along the second axis is longer than the width of the carriage along the first axis.

12. An automatic storage system, comprising:
at least one self-driven carriage for automatically storing and accessing containers in a storage rack arrangement, the carriage comprising: a first wheel set for driving along a first axis; a second wheel set for driving along a second axis extending transverse to the first axis, wherein at least one of the first wheel set and the second wheel set is vertically movable between a driving position and an idle position, wherein the lower one of the first wheel set and the second wheel set is in the driving position and the upper one of the first wheel set and the second wheel set is in the idle position; a support surface for carrying a bottom surface of a container; and a centering and securing system configured to center and secure the container on the support surface, wherein the centering and securing system comprises at least two engaging elements simultaneously movable in opposite directions to each other between an idle position and a securing position, wherein the engaging elements are configured to engage, in the securing position, with the container for securing the container on the support surface, the first wheel set and/or the second wheel set being vertically movable by at least one lift motor, wherein the support surface is vertically movable, by the at least one lift motor, relative to the lower one of the first wheel set and the second wheel set; and
a plurality of containers for being automatically stored and accessed at storage sites in the storage rack arrangement extending over k storage levels,
wherein each container comprises a bottom surface with receiving elements corresponding to the engaging elements of the at least one self-driven carriage, wherein the receiving elements of a container have the same arrangement to each other for all containers.

13. The automatic storage system according to claim 12, further comprising a track arrangement comprising:
first rail tracks having a first track gauge and extending along the first axis and
second rail tracks having a second track gauge and extending along the second axis,
wherein the first track gauge is larger than the second track gauge.

14. The automatic storage system according to claim 13, wherein the track arrangement comprises
at least one interaction site for automatically processing or issuing the containers, at least Z track levels, wherein Z>k, an entry point on the $m^{th}$ track level for the at least one interaction site, wherein me $\{1, \ldots, Z\}$, and an exit point on the nth track level for the one of the at least one interaction site, wherein ne $\{1, \ldots, Z\}$, wherein the track arrangement further comprises for each interaction site:

Z−m first ramps directed downward towards the entry point, m−1 second ramps directed upward towards the entry point, Z−n third ramps directed upward away from the exit point, and n−1 fourth ramps directed downward away from the exit point.

15. The automatic storage system according to claim 14, wherein for each interaction site, the entry point and the exit point are arranged at the same track level.

16. The automatic storage system according to claim 14, wherein one or more of the first one-way ramps, of the second one-way ramps, of the third one-way ramps, and/or of the fourth one-way ramps are arranged to connect adjacent track levels with each other.

17. The automatic storage system according to claim 14, wherein all ramps comprise first rail tracks having the first track gauge.

18. The automatic storage system according to claim 14, further comprising aisle tracks extending, on each storage level, horizontally along the second axis between racks of the storage rack arrangement, wherein all aisle tracks comprise second rail tracks having the second track gauge.

* * * * *